(12) United States Patent
Arieli et al.

(10) Patent No.: US 11,546,574 B2
(45) Date of Patent: Jan. 3, 2023

(54) HIGH RESOLUTION 3D DISPLAY

(71) Applicant: RNVTECH LTD, Jerusalem (IL)

(72) Inventors: Yoel Arieli, Jerusalem (IL); Shay Shalom Gilboa, Moshav Gimzo (IL)

(73) Assignee: RNVTECH LTD, Jerusalem (IL)

( * ) Notice: Subject to any disclaimer, the term of this patent is extended or adjusted under 35 U.S.C. 154(b) by 0 days.

(21) Appl. No.: 17/428,885

(22) PCT Filed: Feb. 18, 2020

(86) PCT No.: PCT/IL2020/050182
§ 371 (c)(1),
(2) Date: Aug. 6, 2021

(87) PCT Pub. No.: WO2020/170246
PCT Pub. Date: Aug. 27, 2020

(65) Prior Publication Data
US 2022/0046225 A1   Feb. 10, 2022

Related U.S. Application Data

(60) Provisional application No. 62/894,999, filed on Sep. 3, 2019, provisional application No. 62/856,766, filed (Continued)

(51) Int. Cl.
*H04N 13/32* (2018.01)
*H04N 13/305* (2018.01)
*H04N 13/363* (2018.01)

(52) U.S. Cl.
CPC .......... *H04N 13/32* (2018.05); *H04N 13/305* (2018.05); *H04N 13/363* (2018.05)

(58) Field of Classification Search
CPC .... H04N 13/32; H04N 13/305; H04N 13/363; H04N 13/351; H04N 13/307;
(Continued)

(56) References Cited

U.S. PATENT DOCUMENTS 6,421,058 B2 *  7/2002  Parikh ..................... G06T 15/04
                                                                    345/553
7,423,796 B2 *  9/2008  Woodgate .............. H04N 13/31
                                                                    348/E13.044

(Continued)

OTHER PUBLICATIONS

International Preliminary Report on Patentability for International Application No. PCT/IL2020/050182 completed Jul. 29, 2021.
(Continued)

*Primary Examiner* — Tung T Vo
(74) *Attorney, Agent, or Firm* — Dorsey & Whitney LLP

(57) ABSTRACT

A device for time-based multiplexing of a projection of a three-dimensional FIG. 1 image to increase its resolution includes a two-dimensional display comprising an array of pixels. An array of optical elements is placed in front of the pixels. The optical elements are structured to refract and configure into multiple parallel light beams, in a plurality of angles, light emitted from the pixels. An array of adjustable light deflecting devices is mounted in front of the pixels. Each of the adjustable light deflecting devices is structured to deflect the light emitted by the pixels. At least one controller is configured to (1) vary at least one of the intensity or color of light emitted by each of the pixels according to three-dimensional information set for display of a three dimensional image; and (2) change a deflection angle of the light deflecting devices during a period of image integration of the human visual system.

21 Claims, 19 Drawing Sheets

Related U.S. Application Data on Jun. 4, 2019, provisional application No. 62/806,948, filed on Feb. 18, 2019.

(58) Field of Classification Search
CPC ...... H04N 13/31; H04N 13/324; G02B 30/24; G02B 30/27; G02B 30/30; G02B 30/36
USPC .......................................................... 348/51
See application file for complete search history.

(56) References Cited

U.S. PATENT DOCUMENTS

| | | | | |
|---|---|---|---|---|
| 7,978,407 B1* | 7/2011 | Connor | ................... | G02B 30/27 348/54 |
| 8,174,564 B2* | 5/2012 | Kim | ....................... | H04N 13/31 348/54 |
| 8,233,103 B2* | 7/2012 | MacNaughton | ..... | H04N 13/398 345/474 |
| 8,542,326 B2* | 9/2013 | MacNaughton | ...... | G02F 1/1335 349/15 |
| 8,704,884 B2* | 4/2014 | Hiddink | ............... | H04N 13/361 348/42 |
| 8,724,063 B2* | 5/2014 | Takagi | ................. | H04N 13/359 349/139 |
| 9,507,928 B2* | 11/2016 | Fuerth | ..................... | G06F 21/36 |
| 10,244,230 B2* | 3/2019 | Haas | ....................... | G02B 26/08 |
| 10,950,162 B2* | 3/2021 | Mandle | ................ | G09G 3/3413 |
| 11,043,157 B2* | 6/2021 | Mandle | ................ | G09G 3/346 |
| 2002/0057275 A1* | 5/2002 | Parikh | ..................... | G06T 17/00 345/522 |
| 2003/0052887 A1* | 3/2003 | Parikh | ................... | G06T 15/005 345/522 |
| 2004/0217956 A1* | 11/2004 | Besl | ....................... | G06T 15/00 345/419 |
| 2004/0240777 A1* | 12/2004 | Woodgate | ............. | G02F 1/1326 385/11 |
| 2005/0168493 A1 | 8/2005 | Damera-venkata | | |
| 2005/0254817 A1* | 11/2005 | McKee | ................ | H04N 13/229 348/E13.028 |
| 2006/0146405 A1* | 7/2006 | Macmaster | .............. | H04N 5/72 348/E5.136 |
| 2006/0203338 A1* | 9/2006 | Pezzaniti | ............. | H04N 13/337 359/465 |
| 2006/0214945 A1* | 9/2006 | Nitta | ..................... | H04N 9/3182 345/603 |
| 2007/0096125 A1* | 5/2007 | Vogel | ...................... | G02B 30/33 257/89 |
| 2007/0165013 A1* | 7/2007 | Goulanian | ........... | H04N 13/398 348/E13.032 |
| 2008/0123182 A1* | 5/2008 | Cernasov | ............. | H04N 13/349 348/E13.043 |
| 2011/0043611 A1 | 2/2011 | Javidi et al. | | |
| 2011/0122236 A1* | 5/2011 | Yamada | ............... | H04N 13/305 348/55 |
| 2011/0211256 A1* | 9/2011 | Connor | ................ | G09G 3/3473 359/463 |
| 2011/0255170 A1* | 10/2011 | Yamada | ............... | H04N 13/305 359/619 |
| 2012/0256916 A1* | 10/2012 | Kitamura | ................ | G01S 17/89 345/419 |
| 2013/0113685 A1* | 5/2013 | Sugiyama | ............ | H04N 13/356 345/32 |
| 2013/0286053 A1* | 10/2013 | Fleck | .................. | G02B 27/0176 345/82 |
| 2014/0071255 A1* | 3/2014 | Okuyama | .............. | G03B 35/18 348/54 |
| 2014/0333735 A1* | 11/2014 | Bathiche | .............. | H04N 13/368 348/54 |
| 2014/0354548 A1* | 12/2014 | Lee | .......................... | G06F 3/038 345/166 |
| 2014/0361990 A1* | 12/2014 | Leister | ................... | G02B 30/31 345/156 |
| 2015/0077850 A1* | 3/2015 | Kasano | .................. | H04N 13/32 359/463 |
| 2016/0041843 A1 | 2/2016 | Ramanathiah et al. | | |
| 2016/0327906 A1* | 11/2016 | Futterer | ................... | G03H 1/02 |
| 2016/0373701 A1 | 12/2016 | Ferri et al. | | |
| 2017/0018215 A1* | 1/2017 | Black | ...................... | H05B 47/00 |
| 2017/0038597 A1* | 2/2017 | Li | ........................... | G02B 30/28 |
| 2017/0059960 A1* | 3/2017 | Shi | .......................... | G06F 3/011 |
| 2017/0139213 A1* | 5/2017 | Schmidtlin | ......... | G02B 27/0176 |
| 2017/0171540 A1* | 6/2017 | Li | ........................ | H04N 13/305 |
| 2017/0195580 A1* | 7/2017 | Muller | ................. | H04N 13/305 |
| 2017/0270637 A1* | 9/2017 | Perreault | ............ | H04N 5/23232 |
| 2017/0315374 A1* | 11/2017 | Zhou | ...................... | G02B 30/24 |
| 2018/0024628 A1* | 1/2018 | Kim | ...................... | G03H 1/2286 345/156 |
| 2018/0107012 A1* | 4/2018 | Xu | ......................... | G09G 3/003 |
| 2018/0124386 A1* | 5/2018 | Kim | ...................... | H04N 13/327 |
| 2019/0004325 A1* | 1/2019 | Connor | ............. | G02B 27/0172 |
| 2019/0064526 A1* | 2/2019 | Connor | ............... | G02B 6/0073 |
| 2019/0243149 A1* | 8/2019 | Iguchi | .................... | G02B 30/26 |
| 2020/0351490 A1* | 11/2020 | Smithwick | ............. | G03B 35/22 |

OTHER PUBLICATIONS

International Search Report from International Application No. PCT/IL2020/050182 dated May 7, 2020.
U.S. Appl. No. 62/806,948, filed Feb. 18, 2019.
U.S. Appl. No. 62/856,766, filed Jun. 4, 2019.
U.S. Appl. No. 62/894,999, filed Sep. 3, 2019.
Allen, et al., "47.4: Invited Paper: Wobulation: Doubling the addressed Yesolution of projection displays", SID Symposium Digest of Technical Papers, vol. 36, No. 1, Oxford, UK: Blackwell Publishing Ltd., 2005, pp. 1514-1517.
Bjelkhagen, "Integral 3-D Imaging Techniques", Techniques and Principles in Three-Dimensional Imaging: An Introductory Approach, IGI Global, Dec. 31, 2013, p. 145.
Didyk, et al., "Apparent Display Resolution Enhancement for Moving Images", ACM Transactions on Graphics, vol. 29, No. 4, Article 113, DOI=10.1145/17787651778850, Jul. 2010, 8 pages.
Shang, et al., "Electrically Controllable Liquid Crystal Component for Efficient Light Steering", IEEE Photonics Journal, vol. 7, No. 2, Feb. 11, 2015, 14 pages.
Written Opinion from International Application No. PCT/IL2020/050182 dated May 7, 2020.

\* cited by examiner

HIGH RESOLUTION 3D DISPLAY

RELATED APPLICATION/S

This application claims the benefit of priority of U.S. Provisional Patent Application No. 62/806,948 filed on Feb. 18, 2019, U.S. Provisional Patent Application No. 62/856,766 filed on Jun. 4, 2019, and of U.S. Provisional Patent Application No. 62/894,999 filed on Sep. 3, 2019, the contents of which are incorporated herein by reference in their entirety.

BACKGROUND

The present invention, in some embodiments thereof, relates to a high resolution and large field of view three-dimensional display, and more particularly, but not exclusively, to a device for time-based multiplexing of a projection of a three-dimensional image to increase a resolution thereof. The present invention also relates, in some embodiments thereof, to a device for imaging a light field with high resolution, and in particular, but not exclusively, to an apparatus for time-based multiplexing of a light field to increase a resolution thereof.

Various methods have been developed for projecting a three-dimensional image from a two-dimensional display. Stereoscopic methods present two offset images separately to the left and right eye of the viewer. These two-dimensional images are then combined in the brain to give the perception of 3D depth. In stereoscopic displays, the 3D image information is limited to a single plane of display. The mix-up between the depth sensation and the accommodation of the eyes leads to eye strain, fatigue, nausea, and slower eye accommodation to object distance.

There are various types of 3D displays that are able to provide a correctly-focused sensation of a 3D image. Volumetric displays use some physical mechanism to display points of light within a 3D space. Each voxel of a 3D image is located physically at a particular spatial position and reflects or emits light from that position toward observers. In combination, the voxels of a 3D volumetric display form a real 3D image. However, there are various problems with volumetric displays, including low resolution, large physical size, and complexity of the systems. These problems make volumetric displays expensive and cumbersome for regular use.

A second category of 3D display is a holographic display. A holographic display is a type of display that utilizes light diffraction to create a virtual three-dimensional image of an object. In these displays, the light wavefronts of the object are reconstructed. A drawback of this technology is that it is highly complex. In addition, creating the extremely detailed wavefronts requires suitable Spatial Light Modulators (SLMs), which are very rare.

Another 3D display technology capable of providing natural retinal focus cues is called Light Field (LF) displays. LF displays use layered LCD panels and compression algorithms at the time of display. A flat form-factor LF 3D display can produce both eye convergence and focus angles simultaneously, by controlling illuminated pixels visible to both eyes. The direction of the light beams from the illuminated pixels is also controlled. This technique has a drawback, however, in that it is capable of displays having a limited field of view and a limited angular resolution.

A light field camera, also known as a plenoptic camera, captures information about a light field emanating from a scene, and also the direction that the light beams are traveling in space. This is in contrast to a conventional camera, which records only light intensity. One type of light field camera uses an array of micro-lenses placed in front of an array of sensors with high resolution to sense intensity, color, and directional information. Another type of light field camera is a multi-camera array. A disadvantage of a light-field camera with a micro-lens array is that the resolution is low. In order to sense directional information with high angular resolution, each micro-lens must be placed in front of many sensors with high fill factor and resolution. This requirement limits the performance of currently known light cameras.

SUMMARY

It is an object of the present invention to provide a 3D display that creates a 3D scene with high resolution and large field of view, and which avoids problems such as eye strain, fatigue, nausea, and slower field accommodation. It is also an object of the present invention to provide a device for imaging a light field with high resolution, including high angular resolution, and without requiring a multi-camera array.

These objectives are achieved, in some embodiments, by increasing the effective number of pixels displayed from a two-dimensional display, so that a three-dimensional image displayed from that display is shown in high resolution. The effective number of pixels is increased through the use of an adjustable light deflecting device, which deflects the light beams emitted by the pixels a number of times within a period of integration of the human visual system.

Thus, for example, if a conventional screen includes 10 pixels that individually emit light, and the emitted light is collimated through a microlens, a viewer looking at the screen from all angles discerns 10 different pixels. With the adjustable light deflecting device according to embodiments of the invention, if the device is adjusted eight times within a period of resolution of the human visual system, the viewer looking at the screen from all angles discerns 80 pixels. Effectively, the screen appears the same as if there were eight times as many physical pixels in the screen. The resulting 3D image is thus viewed in high resolution, without eye strain or similar problems. A similar principle applies to increase the effective number of sensors in a light field imaging device.

According to a first embodiment, a device for time-based multiplexing of a projection of a three-dimensional image to increase a resolution thereof is disclosed. The device includes a two-dimensional display comprising an array of a plurality of pixels. An array of optical elements is structured to refract and configure into multiple parallel light beams, in a plurality of angles, light emitted from each member of a subarray of neighboring pixels defined on the array. An array of a plurality of adjustable light deflecting devices is mounted in front of the pixels. Each of the plurality of adjustable light deflecting devices is structured to deflect the light emitted by the pixels. At least one controller is configured to (1) vary at least one of the intensity or color of light emitted by each of the pixels according to three-dimensional (3D) information set for display of a three-dimensional image; and (2) change a deflection angle of the light deflecting devices a plurality of times within a period of image integration of the human visual system. Advantageously, changing the deflection angle causes the three-dimensional image to be multiplexed, and thus perceived from multiple perspectives within the viewer's field of view. This perception of the image from multiple angles effectively increases the density of effective pixels, thereby enhancing the viewer's ability to resolve the image. At the time of integration of the image, the viewer will perceive that he or she has seen a higher resolution image with a larger number of effective pixels. Furthermore, in each deflected view of the 3-dimensional image, the deflected rays that are emitted from the screen exactly reproduce the rays that were emitted originally from the two-dimensional display. The apparatus also functions equally well regardless of the number of viewers or the location of the viewers relative to the screen. The image is perceived with high angular resolution, with a large field of view, and with a suitability between the depth sensation and the accommodation of the observer's eyes.

In a further implementation according to the first aspect, the array of optical elements is a microlens array, and the two-dimensional display is located at a focal plane of the microlens array. Advantageously, when the two-dimensional display is located at the focal plane of the array, all rays emitted from the pixels are gathered by a corresponding microlens and are projected as a collimated light beam.

In a further implementation according to the first aspect, the array of optical elements is a microlens array, and each microlens and corresponding subarray of neighboring pixels defines a cell. The device further comprises barriers arranged between adjacent microlenses and configured to prevent cross-talk between adjacent cells. Advantageously, prevention of cross-talk between adjacent cells prevents blurring of the image.

In a further implementation according to the first aspect, the array of optical elements is a microlens array, and each corresponding subarray of neighboring pixels for each microlens comprises more than one pixel. Advantageously, deflecting light from more than one pixel with each microlens, as opposed to only a single pixel per microlens, increases the number of angles at which the light is deflected, which therefore increases the field of view of the image.

In a further implementation according to the first aspect, each adjustable light deflecting device deflects light emitted by each member of the subarray of neighboring pixels by less than a width of a pixel. Advantageously, displacement of the image by less than a width of a pixel enables the image to be displayed with super-resolution.

In a further implementation according to the first aspect, the adjustable light deflecting devices comprise one or more of a tunable micro-prism, a liquid crystal system, a microelectromechanical system, an electro-optics device, a liquid crystal polarization grating device, or a micro-mirror. Optionally, the adjustable light deflecting devices comprise an array of micro-prisms and corresponding liquid crystal systems, and the deflection angle of each micro-prism is adjustable by activation of a corresponding liquid crystal system. Advantageously, the liquid crystal system can be finely controlled to continuously or discretely change a deflection angle of light propagating through each microprism.

In a further implementation according to the first aspect, the pixels are RGB pixels, a fill factor of each of the respective red, green, and blue pixels is approximately 25%, and as a result of said time-based multiplexing, light from each of the respective red, green and blue pixels is perceived as being emitted from an entirety of the array of pixels. Advantageously, the apparatus is thus able to increase the effective resolution of the image by a large percentage compared to the fill factor.

In a further implementation according to the first aspect, a first array of polarizers and a second array of polarizers are coplanar to the array of pixels and microlens array. When the light beams emitted by pixels pass through the first and second arrays of polarizers, a first portion of said light beams is polarized in a first direction, and a second portion of said light beams is polarized in a second direction perpendicular to the first direction. Optionally, each microlens and subarray of neighboring pixels parallel thereto defines a 3D pixel, and at least a portion of light rays emitted by pixels of a given cell, after passing through the first and second arrays of polarizers, is diverted to pass through a microlens associated with a different 3D pixel. Advantageously, by diverting light from pixels through neighboring micro-lenses, with use of the polarizers, the apparatus is able to increase the field of view of the displayed image. The "missing" parts of the image from the diverted pixels are filled in as a result of the time multiplexing. Optionally, wherein the pixels are RGB pixels, a fill factor of each of the respective red, green, and blue pixels when passing through the arrays of polarizers is approximately 12.5%, and, as a result of said time-based multiplexing, light from each of the respective red, green, and blue pixels is perceived as being emitted from an entirety of the array of pixels. Advantageously, the apparatus is thus able to increase the effective resolution of the image by a large percentage compared to the fill factor.

In another implementation according to the first aspect, the pixels are RGB pixels, and the device includes one or more color filters. Each of the color filters is configured to permit passage of only one of red, green or blue light. Optionally, each microlens and subarray of neighboring pixels parallel thereto defines a 3D pixel, and the color filters of adjacent cells are patterned cyclically to alternately permit passage of red, green, or blue light. Advantageously, the color filters may be used to divert a portion of the light from pixels through neighboring micro-lenses, so that the apparatus is able to increase the field of view of the displayed image. The "missing places" of the blocked pixels may be completed or filled in as a result of the time multiplexing. The resulting image may be viewed at high resolution in a large field of view.

In another implementation according to the first aspect, the array of optical elements is a microlens array, and a removable micro-lens array is arrangeable cooperatively with the microlens array to neutralize a refraction caused by the micro-lens array. Advantageously, the removable micro-lens array thus enables the display to display an image in conventional 2-dimensional format.

In another implementation according to the first aspect, the adjustable light deflecting devices are located between the array of pixels and the array of optical elements. In another implementation according to the first aspect, the array of optical elements is located between the array of pixels and the array of a plurality of adjustable light deflecting devices. Advantageously, because the effects of the micro-lens array and the adjustable light deflecting device are cumulative, they may be placed at interchangeable places within the apparatus, thus permitting flexibility in the construction of the apparatus.

In another implementation according to the first aspect, the 3D information is set according to an algorithm including the following steps: (1) creating a matrix of 3D data with (x, y, z, R, G, B) vector data for a plurality of points to be displayed; (2) creating a fan of rays for each point to be displayed by calculating a direction of all vectors from that point to a center of each microlens; (3) for each point to be displayed, determining a proper R, G, and/or B subpixel to create of a ray of a point to be displayed, by choosing an R, G, and/or B subpixel that has an angle closest to that of a vector that passes through its cell; (4) for each point to be displayed, turning on the proper R and/or G and/or B subpixels at the proper intensity such as to create the RGB light of the point to be displayed; and (5) if an adjustable light deflecting device is used, performing steps (1)-(4) taking into account a temporal image location of each R and/or G and/or B subpixel. Advantageously, the algorithm may be implemented whenever each unique image to be displayed is changed.

In another implementation according to the first aspect, the array of optical elements is a microlens array, each microlens comprises a flat face and a spherical face, and the spherical face is oriented facing the two-dimensional display. Advantageously, spherical face in such a scenario may be enclosed in or supported by a support which may have a lower refractive index than the microlens array and which forms a flat surface.

According to a second aspect, an apparatus for time-based multiplexing of an image of a light field to increase a resolution thereof is disclosed. The apparatus includes a two-dimensional sensor array comprised of a plurality of sensors. An array of optical elements is placed in front of the sensors. The array of optical elements is configured to refract and focus light from the light field onto one or more sensors. An array of adjustable light deflecting devices is arranged in front of the sensors and configured to deflect an angle of propagation of light received from the light field according to an adjustable deflection angle. A controller is configured to adjust the deflection angle of the light deflecting devices.

Advantageously, changing the refraction or deflection angle as a function of time causes light beams coming from different directions in the scene to be recorded by the sensors. As a result, a different angular image of the scene is recorded as a function of time. This changing of the image from multiple angles effectively increases the resolution of effective sensors, thereby enhancing the ability of the sensors to image the light field.

In another implementation according to the second aspect, the adjustable light deflecting devices comprise one or more of a micro-prism, a liquid crystal microelectromechanical system; an electro-optics device, a liquid crystal polarization grating device, a tunable grating, or a micro-mirror. Advantageously, the adjustable light deflecting devices made of these materials are system can be finely controlled to continuously or discretely change a deflection angle of each micro-prism.

According to a third aspect, a method for time-based multiplexing of a projection of a three-dimensional image to increase resolution thereof is disclosed. The image is generated by a two-dimensional display comprising an array of a plurality of pixels. An array of optical elements is placed in front of the pixels. The focusing element is structured to refract and configure into multiple parallel beams, in a plurality of angles, a light emitted from each member of a subarray of neighboring pixels defined on the array. An array of a plurality of adjustable light deflecting devices is mounted in front of the pixels. Each of the plurality of adjustable light deflecting devices is structured to deflect the light emitted by the pixels. The two-dimensional display also has at least one controller. The method comprises selecting, with the at least one controller, at least one of an intensity or color of light emitted by each of the pixels according to three-dimensional (3D) information for display of a three-dimensional image; and adjusting, with the controller, a deflection angle of the light deflecting devices a plurality of times within a period of image integration of the human visual system.

Advantageously, changing the deflection angle causes the three-dimensional image to be multiplexed, and thus perceived from multiple perspectives within the viewer's field of view. This perception of the image from multiple angles effectively increases the resolution of pixels, thereby enhancing the viewer's ability to resolve the image. At the time of integration of the image, the viewer will perceive that he or she has seen a higher resolution image with a larger number of effective pixels. Furthermore, in each deflected view of the 3-dimensional image, the deflected rays that are emitted from the screen exactly reproduce the rays that were emitted originally from the two-dimensional display. The method also functions equally well regardless of the number of viewers or the location of the viewers relative to the screen. The image is perceived with high angular resolution, with a large field of view, and with a suitability between the depth sensation and the accommodation of the observer's eyes.

In another implementation according to the third aspect, the selecting step comprises following an algorithm having the following steps: (1) creating a matrix of 3D data with (x, y, z, R, G, B) vector data for a plurality of points to be displayed; (2) creating a fan of rays for each point to be displayed by calculating a direction of all vectors from that point to a center of each microlens; (3) for each point to be displayed, determining a proper R, G, and/or B subpixel to create of a ray of a point to be displayed, by choosing an R, G, and/or B subpixel that has an angle closest to that of a vector that passes through its cell; (4) for each point to be displayed, turning on the proper R and/or G and/or B subpixels at the proper intensity such as to create the RGB light of the point to be displayed; and (5) if an adjustable light deflecting device is used, performing steps (1)-(4) taking into account a temporal image location of each R and/or G and/or B subpixel. Advantageously, the algorithm may be implemented whenever each unique image to be displayed is changed.

In another implementation according to the third aspect, the adjustable light deflecting devices comprise one or more of a tunable micro-prism, a liquid crystal system, a microelectromechanical system; an electro-optics device, a liquid crystal polarization grating device, or a micro-mirror. Optionally, the adjustable light deflecting devices comprise an array of micro-prisms and corresponding liquid crystal systems, and the adjusting step comprises activating a liquid crystal system to thereby adjust an angle of deflection of a corresponding micro-prism. Advantageously, the adjustable light deflecting devices made of these materials are system can be finely controlled to continuously or discretely change a deflection angle of each micro-prism.

In another implementation according to the third aspect, the focusing element comprises a micro-lens array, and the method further comprises releasably attaching a removable micro-lens array to the micro-lens array to neutralize a refraction caused by the micro-lens array. Advantageously, the removable micro-lens array thus enables the display to display an image in conventional 2-dimensional format.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
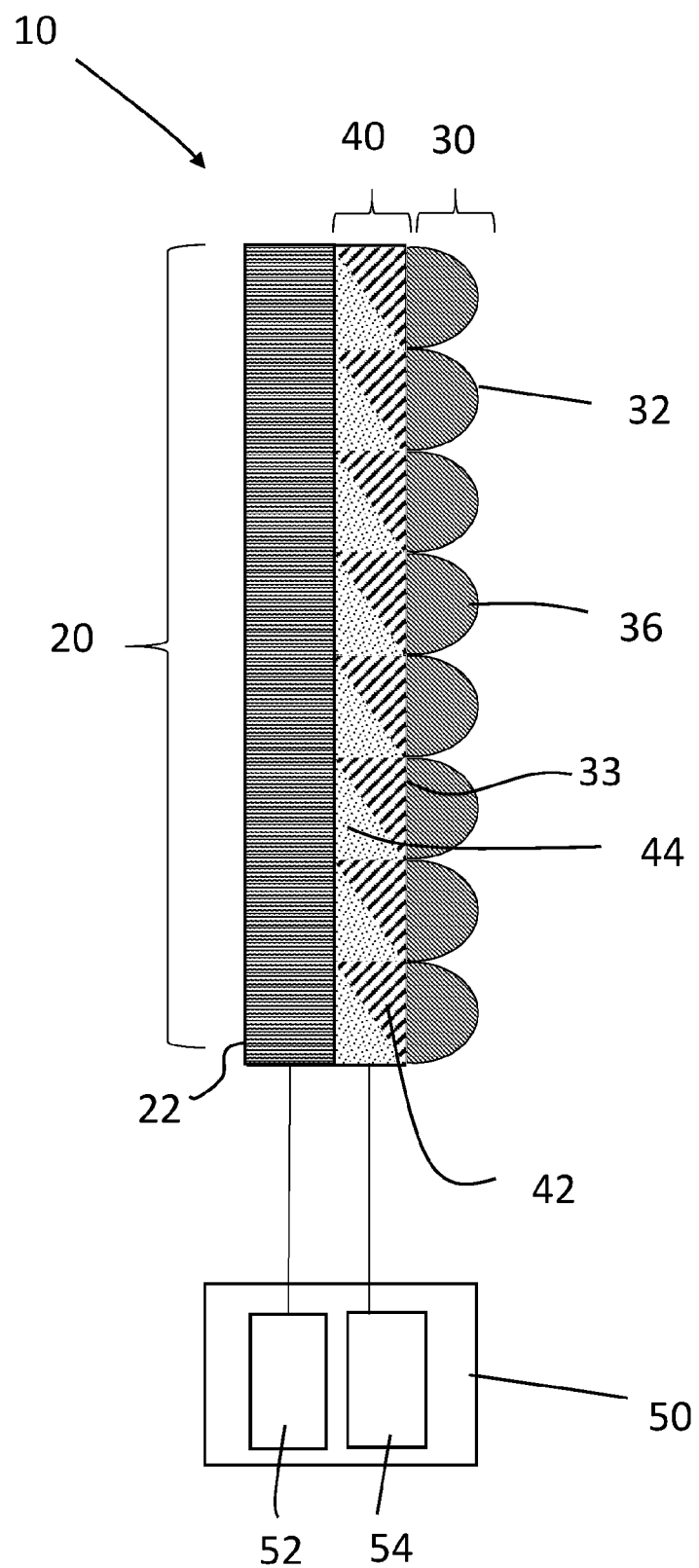
FIG. 1 is a schematic diagram showing components of a device for time-based multiplexing of a projection of a three-dimensional image, according to embodiments of the invention.

The present invention, in some embodiments thereof, relates to a high resolution and large field of view three-dimensional display, and more particularly, but not exclusively, to a device for time-based multiplexing of a projection of a three-dimensional image to increase a resolution thereof. The present invention also relates, in some embodiments thereof, to a device for imaging a light field with high resolution, and in particular, but not exclusively, to an apparatus for time-based multiplexing of a light field to increase a resolution thereof.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 depicts a schematic diagram showing elements of device 10 for time-based multiplexing of a projection of a three-dimensional image. Device 10 includes screen 20, an array of optical elements 30, adjustable light deflecting devices 40, and controller 50.

Screen 20 may be any display suitable for displaying an image. As used in the present disclosure, the terms "screen" and "two-dimensional display" are used interchangeably. In a preferred embodiment, screen 20 has an ultra-high density two-dimensional display with 8K resolution. 8K UHD (7680×4320 pixels) is the highest resolution defined in the Rec. 2020 (UHDTV) standard. An advantage of an 8K display is that the projected image is high resolution, even before the image is multiplexed.

Screen 20 is arranged as a two-dimensional array of a plurality of pixels 22. Pixels 22 may be monochromatic (i.e., grayscale) or RGB pixels.

Array of optical elements 30, in the depicted embodiment, consists of an array of microlenses 32 mounted parallel to the screen 20. The microlens array 30 is situated in front of the pixels 22, meaning that light emitted by the pixels 22 passes through the microlens array 30. As used in the present disclosure, a microlens is a small lens, with a diameter of less than 1 mm, as small as 10 micrometers, or even as small as 1 micrometer. The microlenses 32 may be made of many material known to those of skill in the art, for example, glass, colloidal particles, or liquids patterned through nanolithography. The microlens array 30 may be arranged on a supporting substrate (not shown in FIG. 1).

Microlens array 30 contains multiple microlenses 32 formed in a two-dimensional array. Each microlens 32 has a planar surface 33 and a spherical convex surface 36. In the illustrated embodiment, the spherical surface 36 faces away from the two-dimensional display; however, it is also possible for the spherical surface 36 to be oriented facing the two-dimensional display 20. Preferably, the screen 20 is situated at a focal plane of the microlens array 30. When the two-dimensional display 20 is located at the focal plane of the array 30, all light beams emitted from the pixels 22 are gathered by a corresponding microlens 32 and are projected as a collimated light beam (i.e., a light beam in which all the rays are pointed in the same direction).

Adjustable light deflecting devices 40 are also mounted in front of the pixels 22. In the illustrated embodiment, light deflecting devices 40 consist of tunable microprisms 42. The microprisms 42 are arranged at an angle relative to the plane of the display 20 and microlens array 30. The microprisms 42 are dynamic, meaning that the angle of the microprisms 42 is adjustable, through operation of a suitable electro-optical device. In the illustrated embodiment, each microprism 42 is adjustable through operation of a liquid-crystal based system 44. The liquid crystal system may be configured to change shape, angle, refractive index or polarization based on an electrical input. The liquid crystal may be in the cholesteric, smectic, or nematic phases. The adjustable light deflecting devices 40 may alternatively or additionally include an electro-optics device, a liquid crystal polarization grating (LCPG) device, micromirror or any other known device that can deflect and control an angle of propagation of a light beam.

In the illustrated embodiment, the adjustable light deflecting device 40 is oriented between the screen 20 and the microlens array 30. This orientation is merely exemplary, and the position of the microlens array 30 and the adjustable light deflecting device 40 may be reversed, such that the microlens array 30 is oriented between the screen 20 and the adjustable light deflecting devices 40.

Controller 50 provides instructions to the screen 20 and to the adjustable light deflecting device 40. These functions may be performed by different sub-controllers. For example, the screen may be controlled by screen controller 52, and the deflecting devices 40 may be controlled by deflection controller 54.

Controller 50 may include a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Controller 50 and its sub-controllers may be programmed to receive instructions from a user. For example, the user may select with the controller 50 and/or the screen controller 52 at least one of an intensity or color of light emitted by each of the pixels 22, according to three-dimensional information for the display of a three-dimensional image. This selection may include following an algorithm, as will be described further below.

The user may similarly adjust, with the controller 50 and/or the deflection controller 54, a deflection angle of the light deflecting devices 40 a plurality of times within a time (t) of image integration of the human visual system.

The human visual system is, on average, capable of integrating images approximately every 0.1 seconds. This duration of time will be referred to herein as the "visual integration time." In operation, a user may provide instructions with the controller 50 to divide the visual integration time into n discrete periods, $t_1$ to $t_n$. During each of the periods $t_1$ to $t_n$, an image is displayed from screen 20, and its light is refracted through the microlens array 30 and the adjustable light reflecting devices 40. Between each period, the angle of deflection of the adjustable light deflecting devices 40 (e.g., the angle of deflection of prisms 42) is changed. The change in the angle of deflection may alternatively be continuous. The change in angle of deflection causes a change in the angle of view from which the image generated by the pixels 22 is viewed. As a result, the projection of the image is multiplexed n times during time (t). At the end of the time (t), the eye will perceive an image with a higher resolution, with a larger number of effective pixels, compared to viewing a single display of the image.

FIGS. 2-7B illustrate how the screen 20 and microlens array 30 is used to create a 3D display, and how each of the components of device 10 affects the transmission of the 3D image from the pixels 22.

Figure 2:
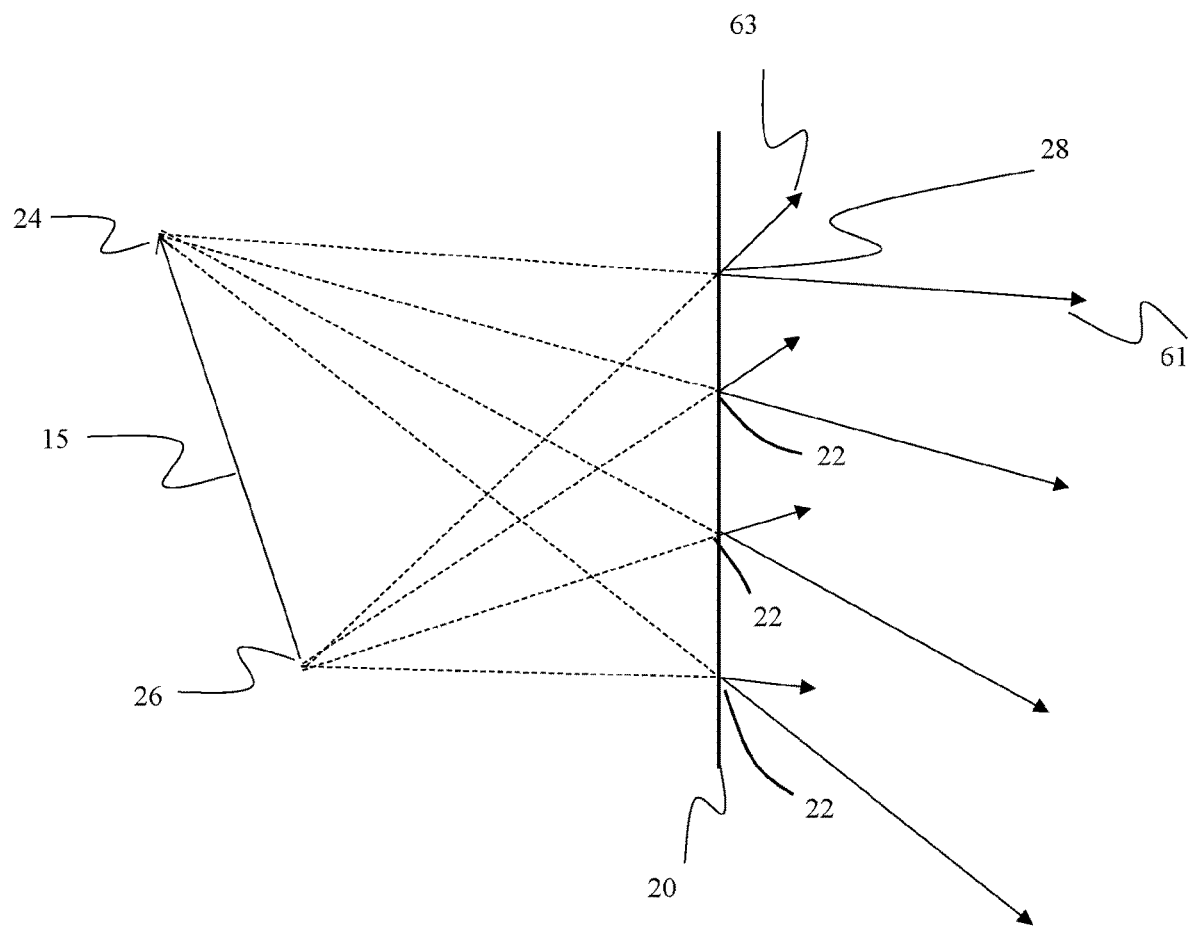
FIG. 2 is a schematic depiction of light beams being projected through a 2D display to appear as if they are three-dimensional, according to embodiments of the invention.

FIG. 2 illustrates on a basic level how screen 20 may be typically used to depict a three-dimensional display. For purposes of illustration, a three-dimensional object projected by screen 20 may be thought to have points 24 and 26 in different planes behind screen 20. A comparable real-life 3D object that is illuminated or self-illuminating (e.g., a light bulb) would emit light rays in all directions from points 24 and 26. Similarly, in order to display a life-like 3D scene from display 20, each point of the display 20 (e.g., each pixel 22), while in actuality all being in the same plane, emits light rays with many different colors, intensities, and angles at the same time. In this way, the observer will be able to observe the image of the 3D object from any angle differently, in accordance with the parallax effect.

By way of example, pixel 28 is one arbitrary point on screen 20. In order to enable an observer to see points 24 and 26 from any angle, pixel 28 should emit light rays with different colors and different intensities to different angles at the same time. In the depicted example, pixel 28 emits ray 61, which appears to be emitted from point 24, and also emits ray 63, which appears to be emitted from point 26. The same analysis applies to each of the pixels 22 on the screen 20. If all pixels 22 on the screen 20 emit rays with appropriate colors, intensities, and angles at once, such that the rays look like continuations of rays that appear to come from all points of a 3D object, the observer will see the image in three dimensions from any perspective.

Figure 3:
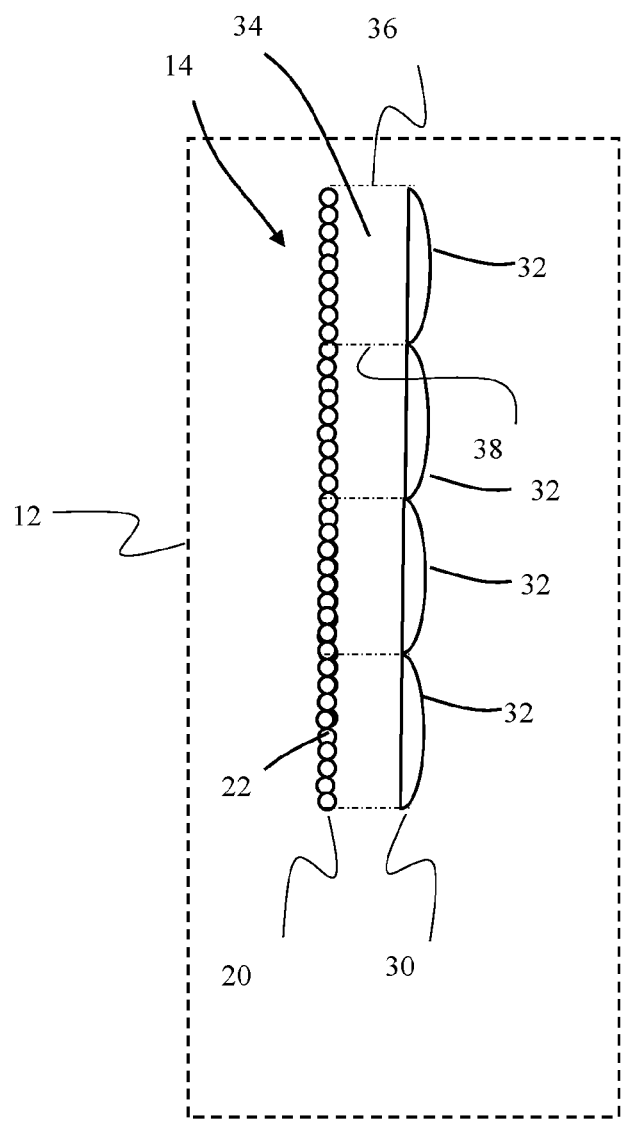
FIG. 3 is a schematic depiction of a microlens array for a 3D display including multiple cells, according to embodiments of the invention.

FIG. 3 depicts the screen 20 of FIG. 2 with a microlens array 30 in front of it. The screen 20 is located at a focal plane of the microlens array 30. The microlens array 30 includes various microlenses 32, and each microlens 32 is coplanar with one or more pixels 22. In the illustrated embodiment, each microlens 32 is opposite a group of pixels 22. The group of pixels that is opposite each microlens is also referred to herein as a "subarray" of pixels.

The combination of screen 20 and microlens array 30 form a 3D display 12, consisting of 3D pixels 14. Each 3D pixel 14 is comprised of a cell 34, which includes one microlens 32 and at least one corresponding pixel 22 of the screen 20. As used in the present disclosure, the terms "cell" and "3D pixel" are used interchangeably. As discussed above, the screen 20 may be any known two-dimensional display, and the pixels 22 may be monochrome or RGB. Barriers 36, 38 are optionally configured between the different cells 34, in order to prevent cross-talk between different cells 34.

Figure 4:
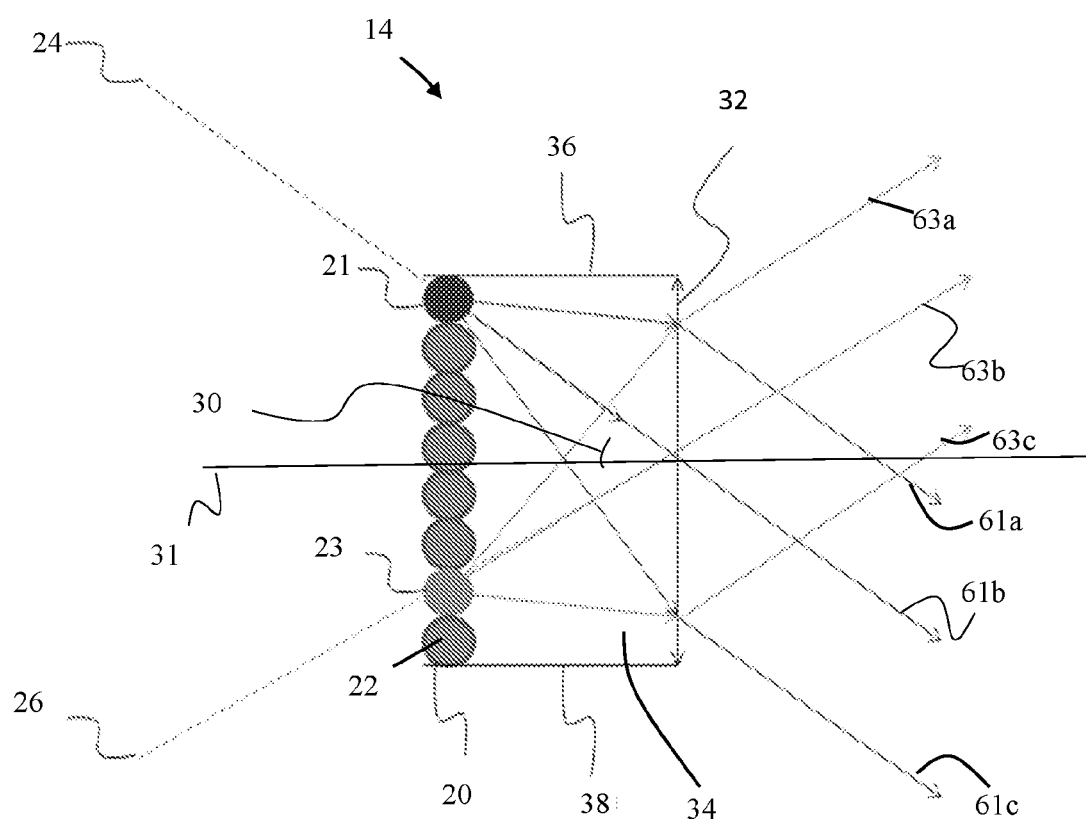
FIG. 4 is a schematic depiction of a single cell of a 3D display, with light beams emitted by pixels and being refracted and collimated by a microlens, according to embodiments of the invention.

FIG. 4 depicts the transmission of light beams through a single 3D pixel 14 of 3D display 12. As in FIG. 3, the 3D pixel 14 or cell 34 includes pixels 22, barriers 36 and 38, and microlens 32. Pixels 22 are located at the focal plane of the microlens 32. In the illustrated embodiment, the pixels 22 are RGB pixels.

As mentioned above, in order to achieve a real 3D image from 3D display 12, each point on the display 12 emits many light rays with different colors, intensities, and angles at once, such that the observer sees the object differently from different angles, due to the parallax effect. Accordingly, since each cell 34 is equivalent to an individual pixel 14 of 3D display 12, each cell 34 emits many light rays with different colors, intensities, and angles at once. In order that each cell 34 will create these many different light rays, the different RGB pixels 22 of the screen 20 are used. For example, in order to create a light ray with a certain intensity and color coming from the direction of arbitrary point 24 of an object, and at the same time to create a different light ray with another intensity and color coming from the direction of another arbitrary point 26 of the object, RGB pixel 21 emits light with the same intensity and color as a ray that theoretically would come from point 24, while at the same time RGB pixel 23 emits light with the same intensity and color as a ray that would theoretically come from point 26. Since the screen 20 and thus each of its pixels 22 is located at the focal plane of the microlenses 32 of the microlens array 30, at each cell 34, all rays emitted from each RGB pixel are gathered by the microlens 32 of that cell 34 and are projected as a collimated light beam, for example, beams 61a, 61b, 61c, 63a, 63b, 63c. Each collimated light beam 61, 63 is oriented at an angle that the emitting pixel creates with the optical axis 31 of the cell 34. RGB pixels 21, 23 are located at certain angles relative to the optical axis 31, and these angles are similar to angles of points 24, 26 of the object as they appear to an observer that looks at light beams emanating from cell 34. Thus, for an observer that looks at cell 34, the light beams 61, 63 look like they come from points 21 or 23 respectively. On the retina of the observer, every light beam from each RGB pixel 22 is focused to a point. The described operation of cell 34 applies for all other points on the displayed 3D object (beyond points 24, 26), and thus the observer sees a 3D object.

The perception of a 3D object continues when the viewer shifts the viewing angle in the right-left or up-down dimensions. Advantageously, since the light rays from each cell 34 of 3D display 12 are collimated and form a narrow beam, the observer sees the displayed object in its "real" distance, and eye strain, fatigue, and nausea are prevented.

Figure 5:
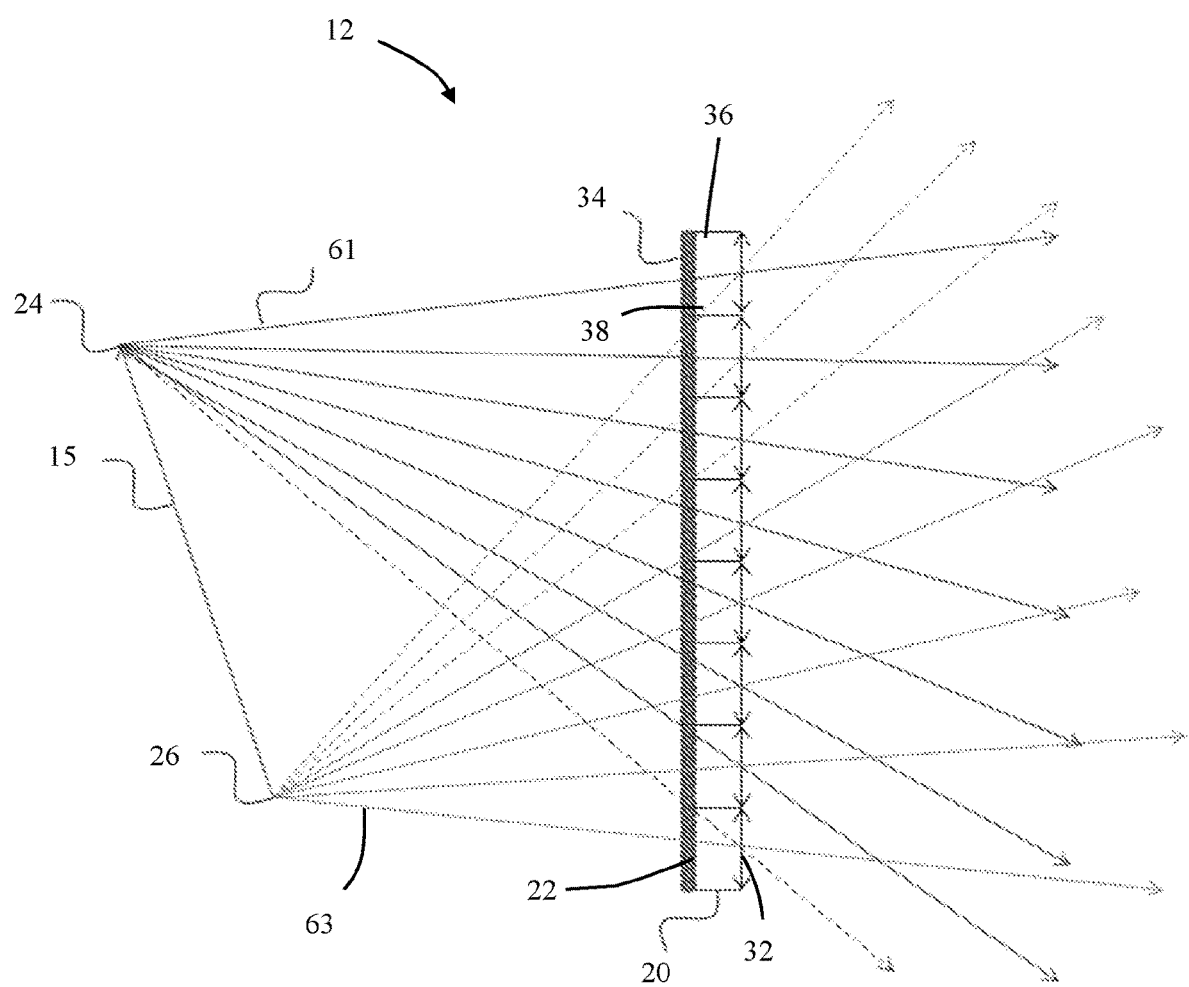
FIG. 5 is a schematic depiction of multiple cells of a 3D display, with light beams being emitted by pixels and being refracted and collimated by a microlens, according to embodiments of the invention.

Referring now to FIG. 5, a more comprehensive setup of 3D display 12 is shown. In this depiction, multiple cells 34 are shown in a single plane, wherein each cell 34 comprises one microlens 32, at least two pixels 22 located at the focal plane of the microlens 32, and optionally two barriers 36, 38. Each individual cell 34 functions as described above in connection with FIG. 4. Thus, to create one point of a 3D object, for instance the point 24, each cell 34 creates a light beam with the same intensity and color as the intensity and color of the rays that theoretically should come from point 24. Each cell 34 creates this beam with a different angle of propagation. This is achieved by the appropriate RGB pixel or pixels 22 in each cell, which emits or emit light with the same intensity and color as the intensity and color of the ray that should theoretically come from point 24, but is located in the appropriate angle relative to the optical axis of the cell 34. As a result, for an observer, the fan of all beams from all cells 34 of the 3d display 12 is seen as coming from point 24. Similarly, to create another point of the 3D object 15, for instance point 26, each cell 34 creates a light beam with the same intensity and color as the intensity and color of a ray that should come from point 26, each cell creates a light beam with the same intensity and color as the intensity and color of a ray that should come from point 26, based on propagation of light from the appropriate RGB pixel or pixels 22, oriented at in the appropriate angle relative to the optical axis of the cell 34. Thus, for the observer, the fan of all beams from all cells 34 of the 3D display 12 are seen as coming from point 26. The perception of a 3D object continues when the viewer shifts the viewing angle in the right-left or up-down dimensions.

The system described above has various advantages. Since the 3D display 12 creates many light beams with the proper angles that are seen as coming from the proper points of a 3D object, it is suitable for many different observers at once where each one will see the object in different angle according to his or her position relative to the 3D display 12. In addition, since the light beams from each cell 34 of the 3D display 12 are collimated and projected in a narrow beam, the observer sees the object at its "real" place. Eye strain, fatigue and nausea are prevented.

However, the 3D display 12 depicted in FIGS. 4 and 5 still provides only limited 3D resolution. Due to the limited number of RGB pixels 22 in each cell 34, the different angles of beams that can be generated are limited. Many close points of the 3D object may be reconstructed by the same RGB pixel 22 of each cell 34, and thus the angular resolution of the reconstruction is reduced. Moreover, due to the limited fill factor of the R, G, and B subpixels in any given RGB pixel 22, each of the R, G, and B subpixels does not cover the entire angular range, and thus the angular resolution of the reconstruction is reduced.

One possible way to increase 3D resolution is to increase the focal length of the microlens 32, in order to decrease the angular subtense of a pixel 22 relative to the microlens 32. However, increasing the focal length results in a corresponding limitation in the field of view. Another approach is to increase the number of RGB pixels 22 in order to increase the field of view. However, this increase also results in increasing the aperture dimensions of the microlenses, which correspondingly results in decreasing the lateral resolution of the 3D display.

The present disclosure presents another approach to increasing the effective number of RGB pixels 22 in each cell 34. In each cell 34, an adjustable light deflecting device 40 is added, either before or after the microlens 32. The adjustable light deflecting device 40 is adjusted one or more times, discretely or continuously, within a period of image resolution of the human visual system, thus effectively multiplying the number of pixels that are visible to the viewer.

Figure 6A:
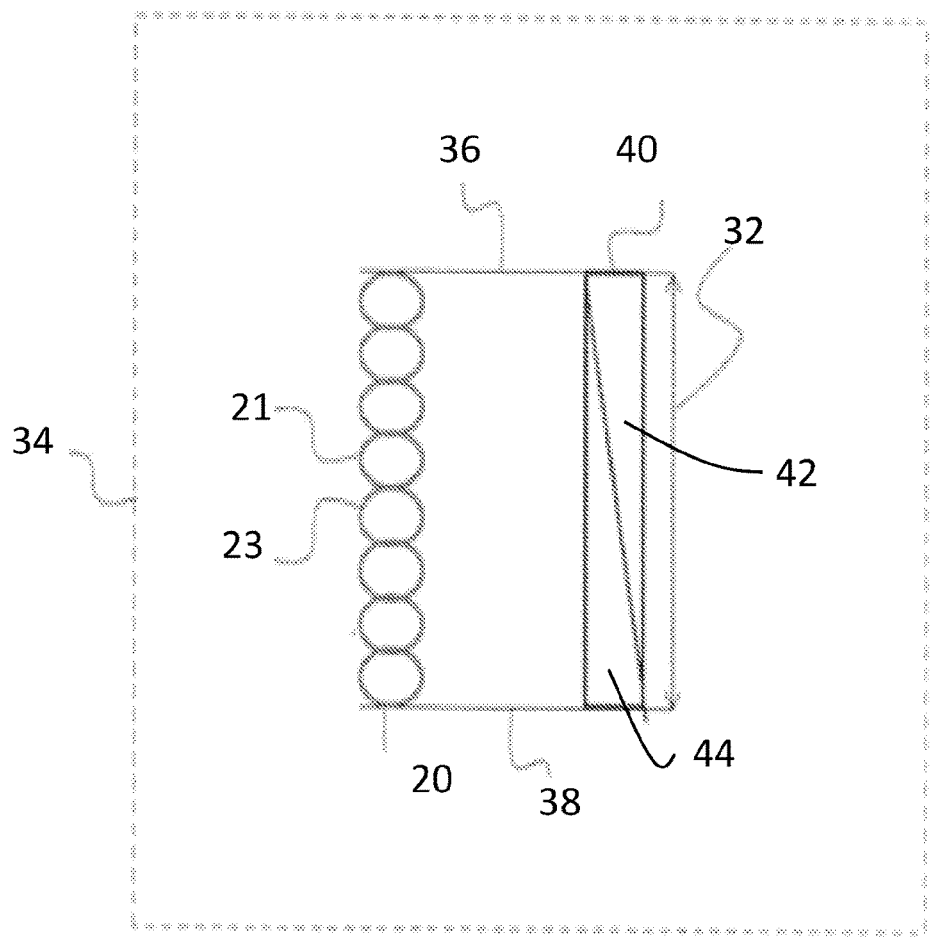
FIG. 6A is a schematic depiction of a single cell of a 3D display having an array of pixels, a microlens, and an adjustable light deflecting device, according to embodiments of the invention.

Referring to FIG. 6A, cell 34 of 3D display 12 includes at least one RGB pixel 22 of a 2D display screen, at least one microlens 32, and two optional barriers 36, 38. Cell 34 also includes adjustable light deflecting device 40. Deflecting device 40, in one embodiment, is comprised of microprism 42 and a liquid crystal system 44. The liquid crystal system 44 is operable to deflect the angle of microprism 42, as described above in connection with FIG. 1. The adjustable deflecting device 40 may also be, in addition or in the alternative, an electro-optics device, a liquid crystal polarization grating, a micromirror, or any other known device that can deflect and control the angle of propagation of the light beam. When the angles of refraction or deflection of the light beams are changed as a function of time, different images of the RGB pixels 22, in different angles, are obtained.

Figure 6B:
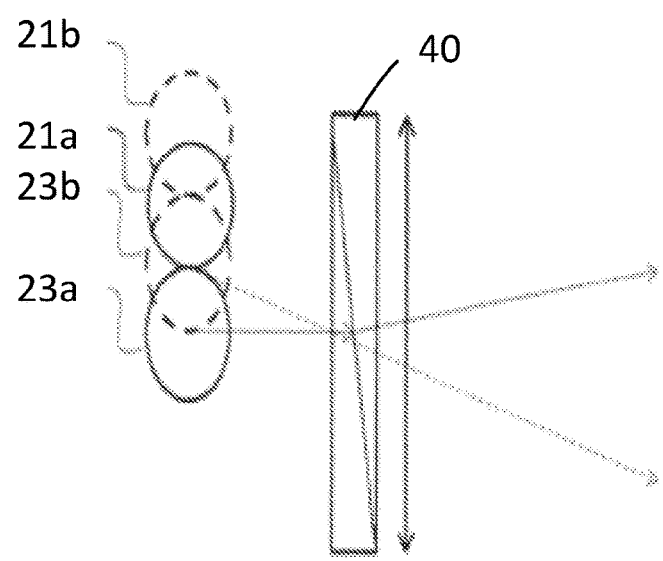
FIG. 6B is a schematic depiction of the adjustable light deflecting device of FIG. 6A being used to multiplex light from a 3D display, according to embodiments of the invention.

FIG. 6B shows the images of two RGB pixels 21, 23 appearing to the viewer at two separate times. At one deflection state of the deflecting device 40, pixels 21, 23 are seen as RGB pixels 21a and 23a, and at another deflection state of the deflecting device they are seen as RGB pixels 21b, 23b. RGB pixels 21b, 23b are thus perceived as located in different locations, for example, in between the RGB pixels 21a, 23a. As a result of the deflection, the effective number of RGB pixels is increased, and the overall angular resolution of the 3D display is improved.

In one embodiment, the perceived deflection of pixels 21, 23 is less than a width of a pixel. Displacement of the image by less than a width of a pixel enables the image to be displayed with super-resolution.

The angles of deflection of the light beams of each cell 34 may be varied continuously or discretely many times, so that the image of each pixel may be seen at a different angle during a different part of the time of image integration.

Figure 6C:
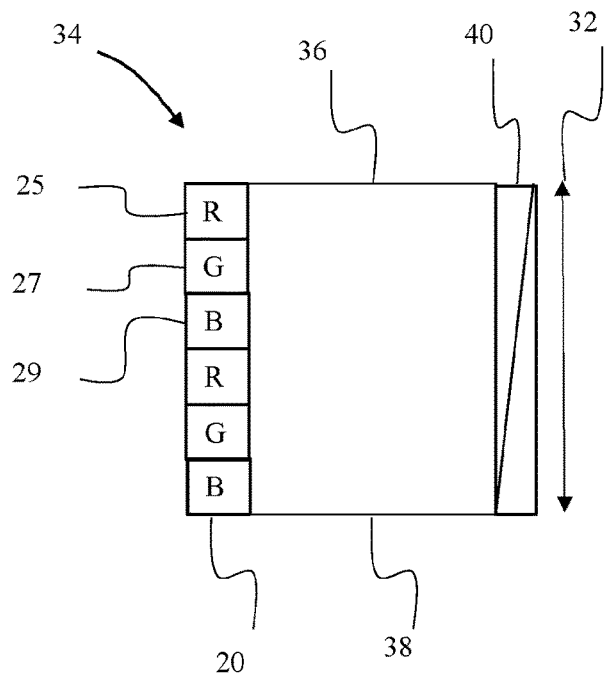
FIG. 6C is a schematic depiction of a single cell of a 3D display having an array of RGB pixels, a microlens, and an adjustable light deflecting device, according to embodiments of the invention.

FIG. 6C shows a single cell 34 of the 3D display, with at least one RGB pixel. Each RGB pixel 22 comprises subpixels R, G, and B, for example, R subpixel 25, G subpixel 27, and B subpixel 29. Since the fill factor of each of the subpixels R, G, and B is less than 100%, less than the whole angular range is "covered" by the R, G, and B subpixels. Accordingly, the angular resolution of the projected image is reduced. In addition, the angular resolution of the cell 34 is limited, due to the limited angular subtense of each subpixel R, G, B. Changing the angles of refraction and deflection as a function of time, with the adjustable light deflecting device 40, causes different images of the subpixels R, G, and B in different angles to be obtained.

Figure 6D:
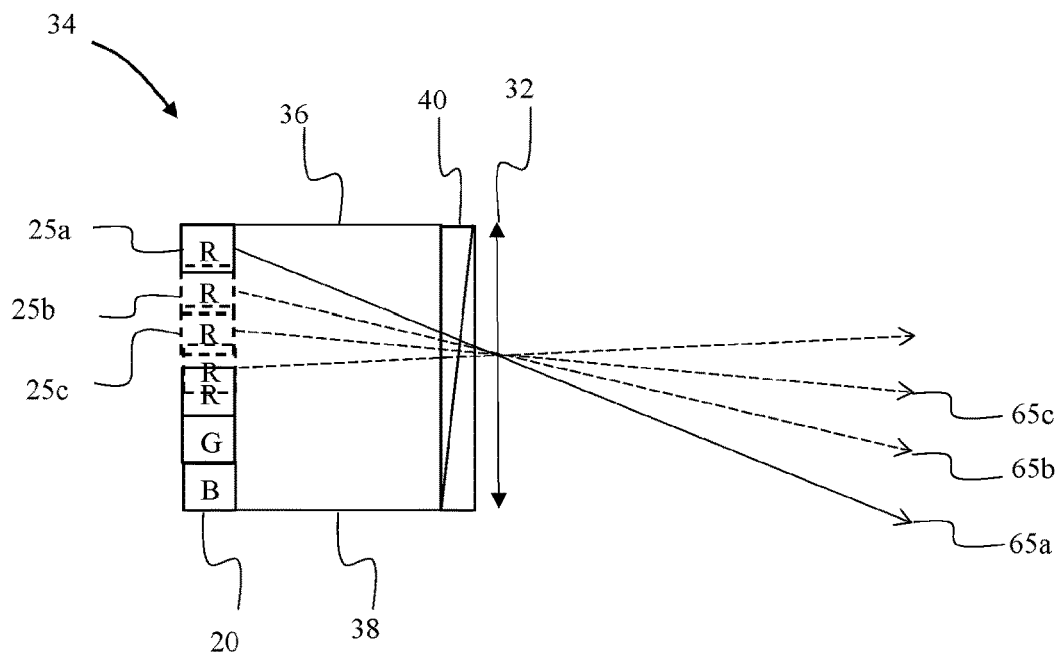
FIG. 6D is a schematic depiction of the adjustable light deflecting device of FIG. 6C being used to multiplex light from the cell of FIG. 8C, according to embodiments of the invention.

FIG. 6D shows different images of the R subpixel 25 in the cell 34 of FIG. 6C. At one deflection state of the deflection device 40, the R subpixel is seen as R subpixel 25a; in another deflection state of the deflection device 40, the R subpixel is seen as R subpixel 25b; and in a third deflection state, the R subpixel is seen as R subpixel 25c. The light rays of the R subpixel correspondingly emerge from cell 34 in different directions, appearing as beams 65a, 65b, and 65c, respectively. The same process takes place for each of the R, G, and B subpixels, in each of the cells 34, for the entire 3D display. This, in turn, increase the effective number of R, G, and B subpixels, and thus the increases the fill factor of each subpixel.

In 3D displays, unlike in 2D displays, it is desirable to have a display in which the pixels or subpixels have a fill factor significantly less than 100%. In such systems, the angular subtense of each pixel is small, and accordingly it is possible to generate a 3D image with a high angular resolution. Correspondingly, however, such a system requires display of multiple images through modulation of the pixels from the 2D display. The effective multiplication of pixels thus compensates for a lower fill factor.

Notably, in a display with RGB pixels, each of the R, G, and B subpixels occupies approximately 25% of the display, with the remainder of the display taken up by mechanical components. The effect of the time-based multiplexing is to increase the effective number of R, G, and B subpixels, such that each R subpixel is multiplexed to the space covering the G and B subpixels, and vice versa. Thus, light from each of the respective red, green, and blue subpixels is perceived as being emitted from an entirety of the array of pixels.

In addition to varying the deflection state, it is also possible to vary the intensity and color of the subpixels, whether continuously or discretely. This varying also causes the effective number of RGB pixels to be increased. The fill factor is correspondingly increased, and the angular resolution of the 3D display is improved.

Figure 7A:
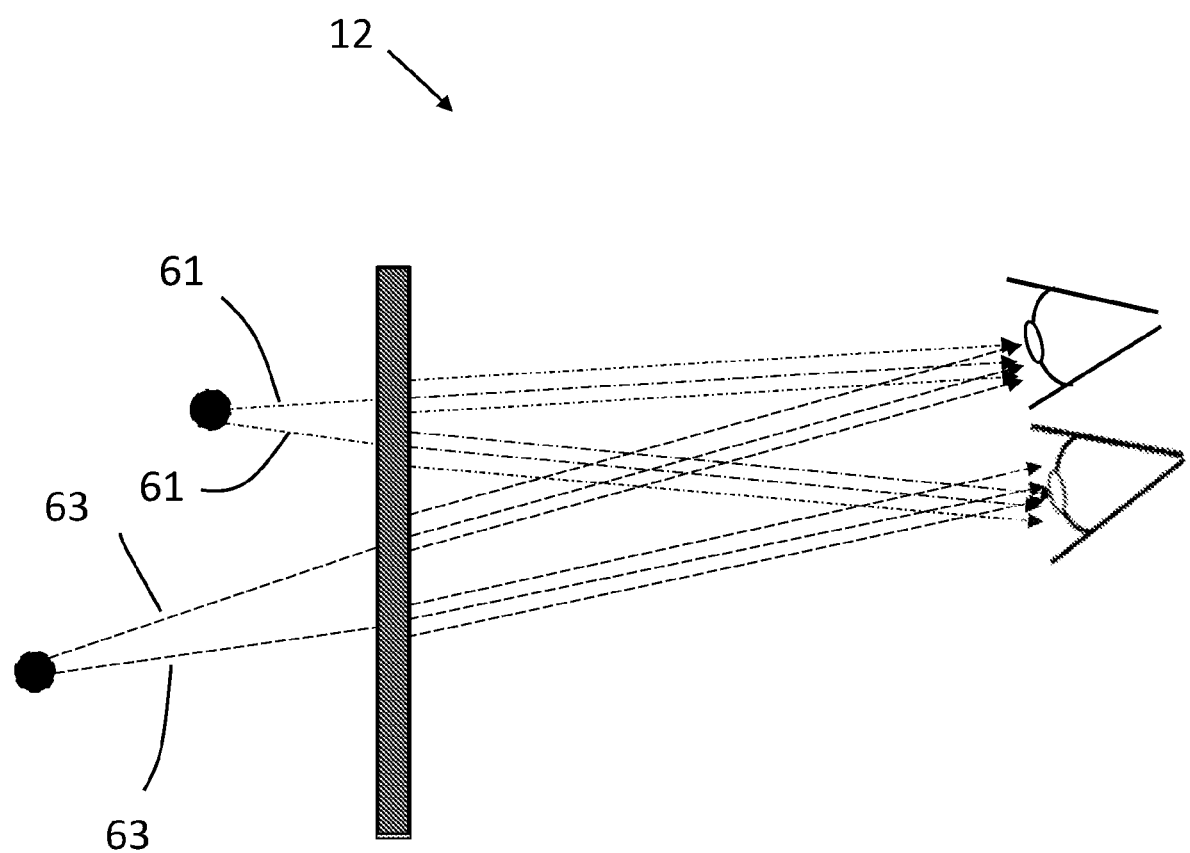
FIG. 7A is a schematic depiction of two multiplexed light beams being projected to a user's eyes through a 3D display, according to embodiments of the invention.
Figure 7B:
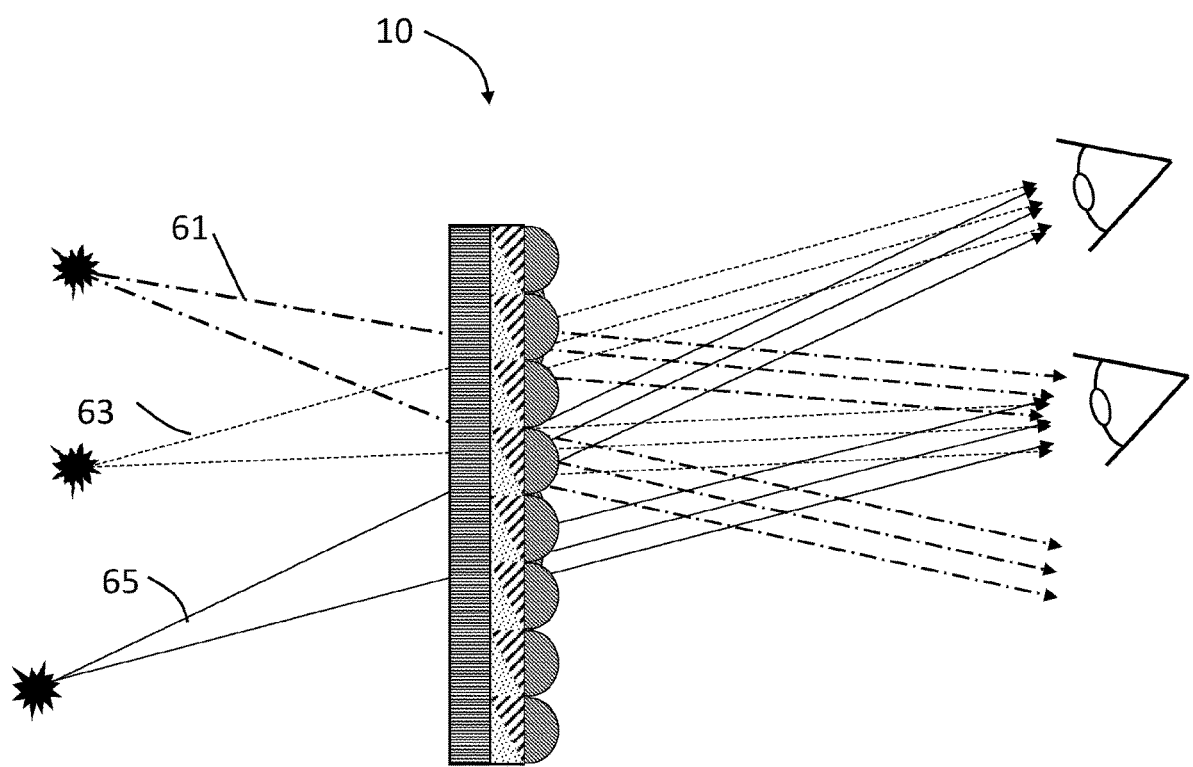
FIG. 7B is a schematic depiction of three multiplexed light beams being projected to a user's eyes through a 3D display, according to embodiments of the invention.

FIG. 7A is a schematic depiction of two light beams 61, 63 being multiplexed three times and projected to a user's eyes through a 3D display. FIG. 7B is a schematic depiction of three multiplexed light beams 61, 63, 65 being projected to a user's eyes through a 3D display, according to embodiments of the invention. As can be seen in FIGS. 7A-7B, the effect of the multiplexing is to increase the effective resolution of the light beams 61, 63, 65, in this example by a factor of three.

Figure 8:
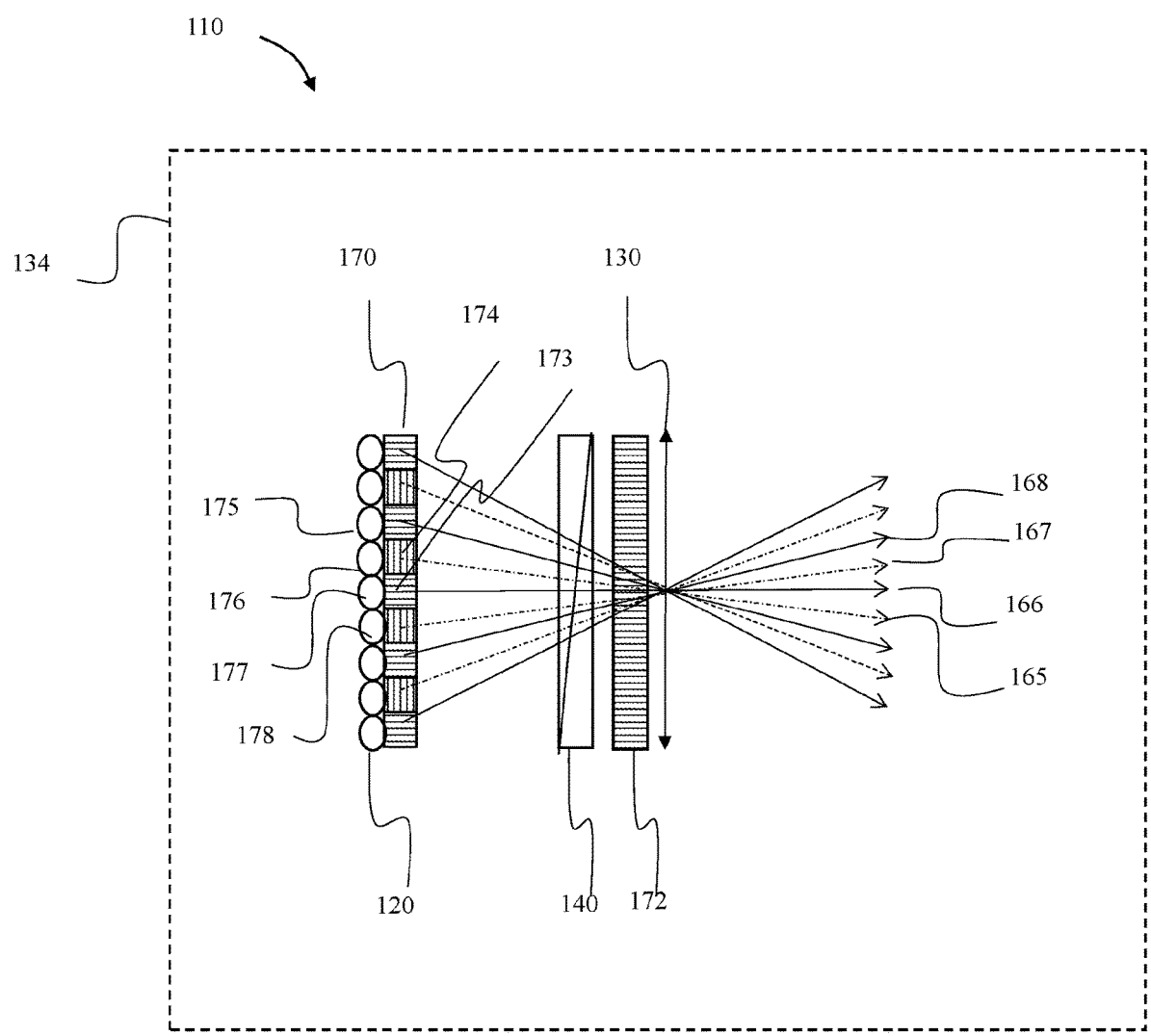
FIG. 8 is a schematic depiction of a single cell of a 3D display with a microlens, adjustable light deflecting device, and polarizers used to enlarge a field of view, according to embodiments of the invention.

Referring now to FIG. 8, a second embodiment 110 of a device for time-based multiplexing of a projection of a three-dimensional image is disclosed. Device 110 is similar in most respects to device 10, and thus similar elements have similar reference numerals, except that the reference numerals begin with "1." Device 110 differs from the previously described embodiments in that it includes a first array of polarizers 170 a second array of polarizers 172 coplanar two the microlens array 130. In the illustrated embodiment, the first array of polarizers 170 is adjacent to the array of pixels 120, and the second array of pixels 172 is configured between the array of pixels 120 and the microlens array 130. This configuration is merely exemplary, and other configurations are possible. The polarizers 170, 172 enable the device 110 to display a 3D image over a larger field of view than the previously described embodiments.

In operation, first array of polarizers 170 includes a first group of polarizers 173 with a polarizing direction parallel to the polarizing direction of polarizer 172, and a second group of polarizers 174 with a polarizing direction perpendicular to the polarizing direction of polarizer 172. Polarizers 173, 174 are alternately positioned along array of pixels 120, with each polarizer 173, 174 parallel to a different pixel or group of pixels, so that light emitted from adjacent cells is alternately polarized by polarizer 173 or 174. For example, light emitted from odd-numbered pixels 175 and 177 is polarized by polarizers 173 with a polarizing direction parallel to the polarizing direction of polarizer 172, and light emitted from even-numbered pixels 176 and 178 is polarized by polarizer 174 with a polarizing direction perpendicular to the polarizing direction of polarizer 172. Accordingly, light rays 165 and 167 emitted from pixels 175 and 177, respectively, are polarized in the direction parallel to the polarizing direction of polarizer 172, and they pass the polarizer 172.

On the other hand, light rays 166 and 168 emitted from pixels 176 and 178, respectively, are polarized in a direction perpendicular to the polarizing direction of polarizer 172, and thus are blocked by polarizer 172. Polarizers 170, 172 need not be located in their exact positions as depicted in FIG. 8, and may be located in any plane within cell 134, so long as they achieve the function of transmitting the light of part of the pixels in the cell 134 and blocking the light of the other part of the pixels in the cell.

Figure 9:
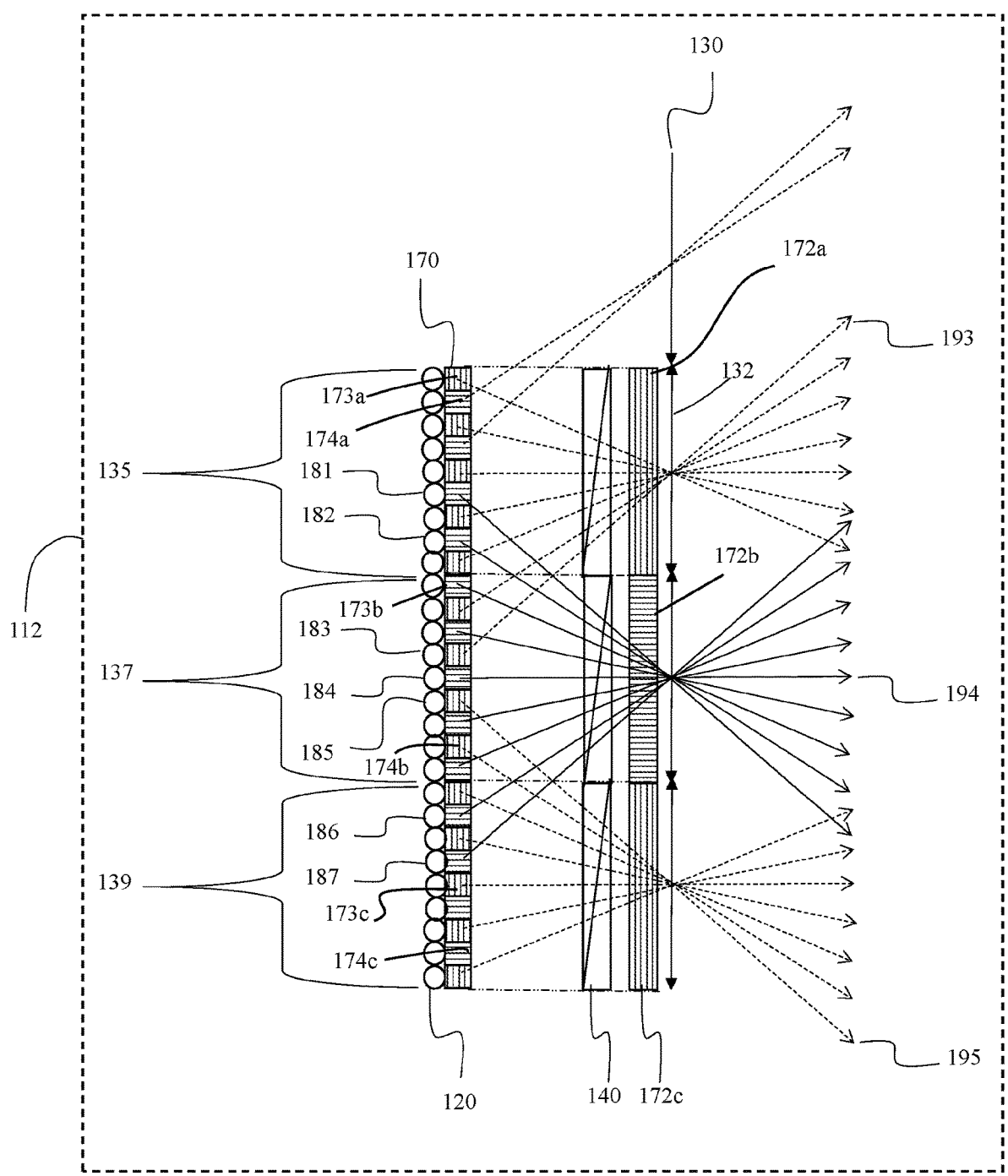
FIG. 9 is a schematic depiction of three adjacent cells with polarizers, illustrating the polarizers widening a field of view of a projected image, according to embodiments of the invention.

FIG. 9 is a schematic depiction of three adjacent cells 135, 137, 139 with polarizers 170, 172, 174, and illustrating the effect of the polarizers 172, 174, 176 in widening a field of view of a projected image. Each of cells 135, 137, 139 comprises at least one RGB pixel. In the illustrated embodiment, the cells each have a subarray of pixels with a plurality of pixels. For example, cell 137 has pixels 183, 184, and 185. Each cell also has at least one microlens 132, and at least one deflecting device 140. As described above in connection with FIG. 8, each cell also has a polarizer 172a, 172b, 172c, with a first polarizing direction. Polarizers 173a, 173b, 173c and 174a, 174b, and 174c alternately cover the pixels of each cell, where each respective polarizer 173 has a polarizing direction parallel to the polarizing direction of polarizer 172, and each respective polarizer 174 has a polarizing direction perpendicular to the polarizing direction perpendicular to the polarizing direction of polarizer 172. Cells 135, 137, 139 do not have any barriers between them.

Notably, in this embodiment, the polarizing directions of polarizers 172 of any two adjacent cells, such as cells 135 and 137 or 137 and 139, are orthogonal to each other. As explained above, as a result of the polarizers, the light rays of some pixels, such as ray 194 emitted by pixel 184 in cell 135, pass its polarizer 172b. On the other hand, since the polarization directions of the polarizers 172a in cell 135 and 172c in cell 139 that are adjacent to cell 137 are perpendicular to the polarization direction of polarizer 172b, light rays such as rays 193 and 195 emitted by the blocked pixels 183 and 185 in cell 137 can pass the polarizers 172a and 172c only in the adjacent cells 135, 139, respectively. As a result, a wide-angle light projection of each cell can be obtained, thereby increasing the field of view of the image. In other words, using pixels that radiate their light to adjacent cells, a figure can be created that is viewable in a large field of view. The "missing places" of the pixels in any particular cell can be filled in or completed by deflecting the images of the pixels of that cell angularly using the deflection device 140, as described above. As can be recognized by those of skill in the art, the polarizer 173, 174 of every cell 134 must be correlated to the polarity of light that is designed to pass through that cell.

In this embodiment, due to the effect of the polarizers allowing only half of the pixels of each cell to emit light through their own cells, a fill factor of each of the red, green, and blue subpixels is only approximately 12.5%. As a result of the time-based multiplexing, light from each of the respective red, green, and blue pixels is perceived as being emitted from an entirety of the array of pixels.

Figure 10:
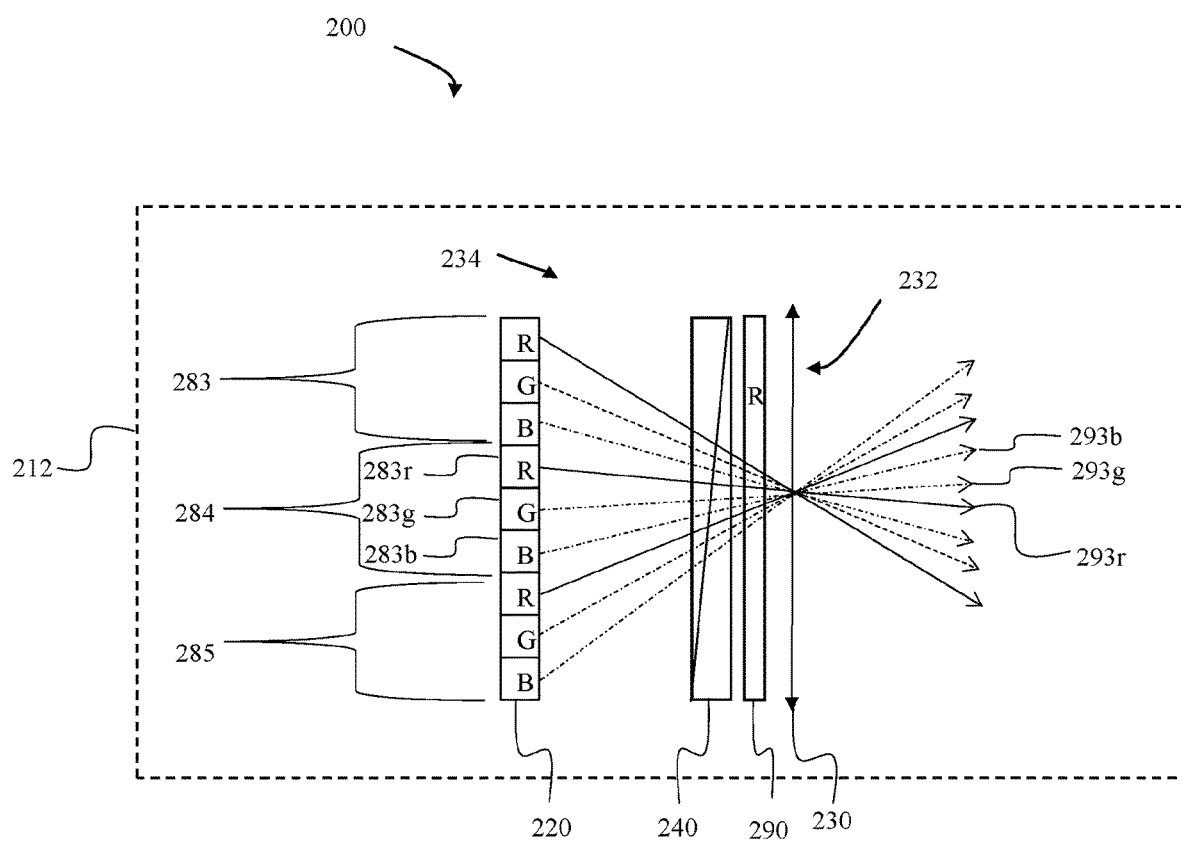
FIG. 10 is a schematic depiction of the cell of FIG. 9 in which the display is comprised of RGB pixels, according to embodiments of the invention.

FIG. 10 shows another embodiment 210 of a device for time-based multiplexing of a projection of a three-dimensional image. As in the embodiment 110 of FIGS. 8 and 9, embodiment 210 is configured to display a 3D image over a large field of view. Embodiment 210 is similar in most respects to the previous embodiments, and accordingly similar elements are assigned similar reference numerals, except that the reference numerals begin with "2."

Each cell 234 includes at least one RGB pixel of a 2D screen, for example, pixels 283, 284, and 285; at least one deflecting device 240, and a microlens 232. In addition, there is a filter, such as red filter 290. Accordingly, light rays such as ray 293r emitted by red subpixels of the RGB pixels, such as pixel 283r, pass through the red filter 290. However, light rays such as 283g and 283b emitted by the green and blue subpixels of the RGB pixels in cell 234 are blocked by red filter 290. The filters 290 may be located in any plane inside the cell 234 or even outside the cell 234 to achieve the function described herein, which is to transmit light of part of the pixels in cell 234, and to block the light of the other part of the pixels of the cell 234.

Figure 11:
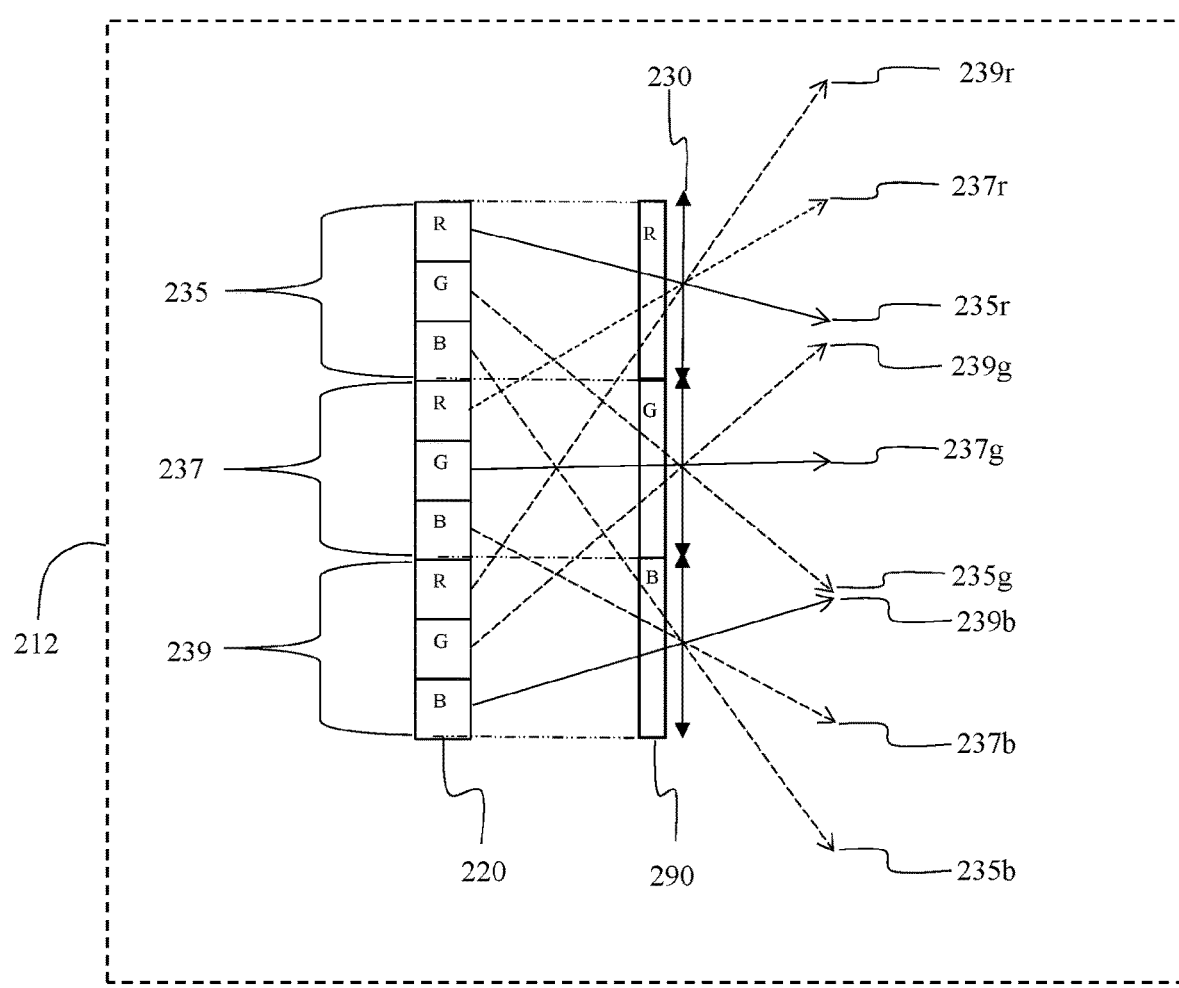
FIG. 11 is a schematic depiction of a 3D display with a microlens, adjustable light deflecting device, and an RGB filter, according to embodiments of the invention.

FIG. 11 shows part of a 3D display comprised of cells of the kind depicted in FIG. 10. FIG. 11 shows three adjacent cells 235, 237, and 239 of the 3D display. Each cell comprises at least one RGB pixel of a 2D screen 220. For simplicity, only one RGB pixel with only one group of R, G, and B subpixels is depicted. Each cell also includes at least one deflecting device (not shown) and a microlens 232. In addition, each cell has a filter 290.

Filters 290 in adjacent cells of the 3D display are patterned cyclically to alternately permit passage of red, green, or blue light. As a result of the filters, the light rays emitted by the subpixels R, G, and B in each cell that have the same color of the filter 290 of that cell pass the filter 290. The light rays emitted by subpixels whose color is different from that of the filter 290 are blocked by the filter. For example, cell 235 has a red filter. Rays of its R subpixels such as ray 235r pass the R filter 290 of that cell, but rays emitted by its G and B subpixels are blocked by the R filter. However, the light rays emitted by the blocked G and B subpixels in cell 235 can pass the filters 290 in the adjacent cells 237 and 239. For example, ray 235g can pass the G filter at cell 237, and ray 252b can pass the B filter at cell 239. As a result, a wide-angle light projection is obtained, with a large field of view. The "missing places" of the pixels in each cell can be completed by deflecting the images of the pixels using the deflection device 240, as described above.

Figure 12:
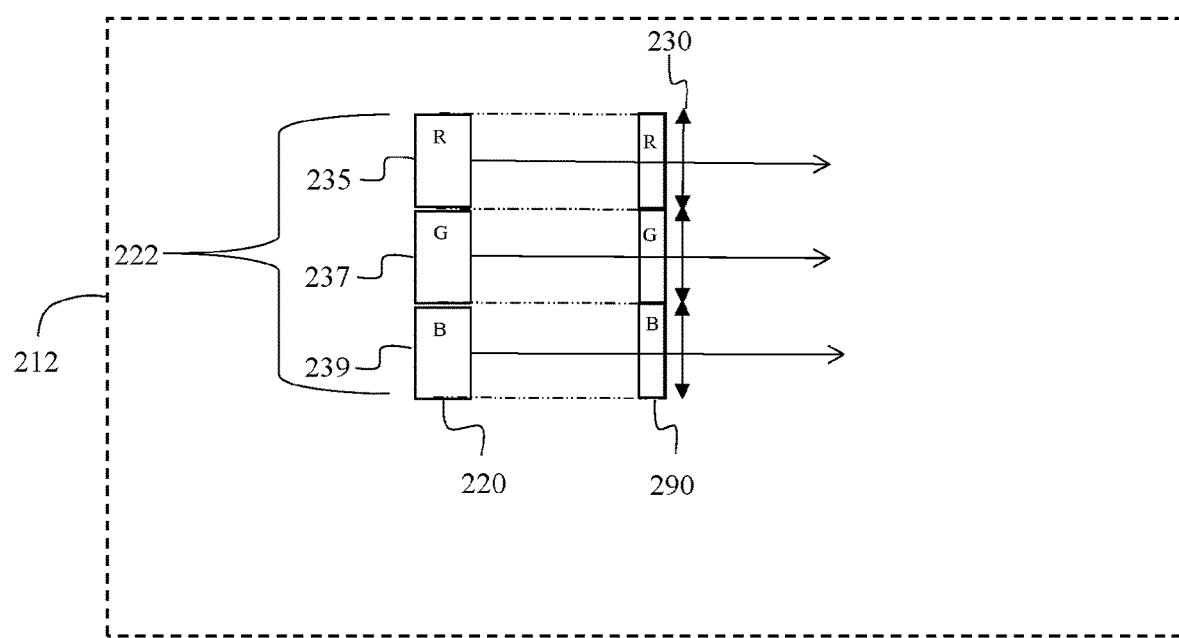
FIG. 12 is a schematic depiction of a 3D display with a microlens, adjustable light deflecting device, and an RGB filter, with a single RGB pixel corresponding to each microlens, according to embodiments of the invention.

Referring now to FIG. 12, the principle of the embodiment of FIG. 11 is extended to a case where each cell of the 3D display comprises only one of the R, G, or B subpixels. Element 222 represents a single RGB pixel of a 2D display 220, and elements 235, 237, and 239 represent three cells of a 3D display, wherein each of cells 235, 237, 239 comprises only R, G, or B subpixels of the RGB pixel 222. As in the embodiment of FIG. 11, the field of view of each cell increases due to passage of light rays only through certain filters 290, and the "missing places" of the pixels are completed by deflecting the images of the pixels using the deflection device. An advantage of this embodiment is that, in addition to achieving large field of view and high angular resolution, there is also high lateral resolution in the 3D display, since the dimensions of each cell of the 3D display is comparable to the dimensions of 2D display pixels 222.

The above-described embodiments are merely exemplary, and any kind of filters, cell arrangements, and filter arrangements or ordering may be applied in order to increase the field of view.

Figure 13:
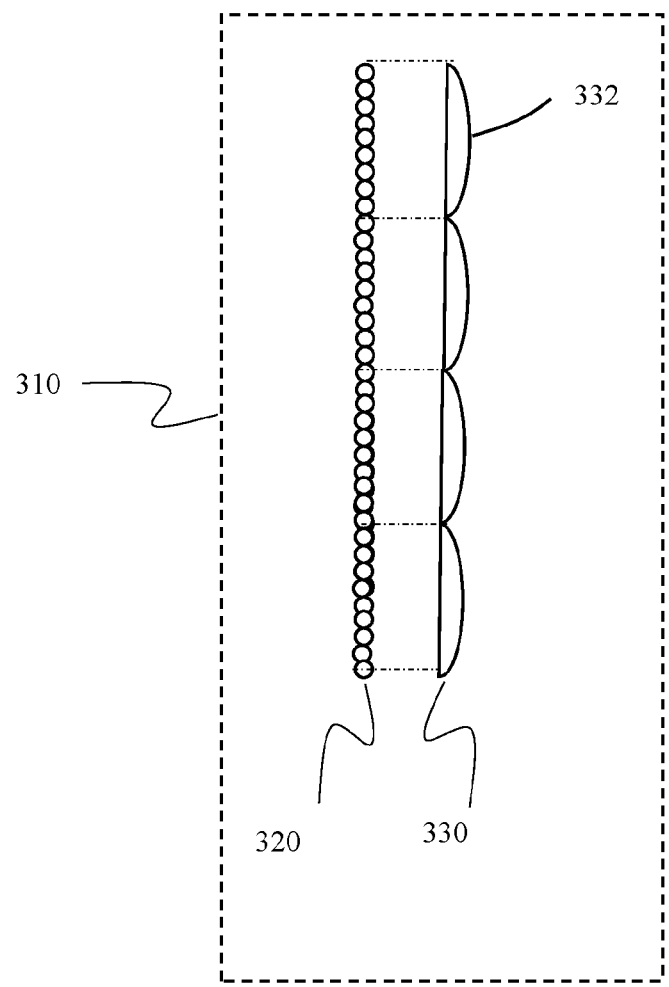
FIG. 13 is a schematic depiction of a light field imaging system, according to embodiments of the invention.

FIG. 13 depicts components of a light field imaging system 310, which may be implemented according to principles discussed in connection with the above-described embodiments. Light field imaging device 310 has similar components to the previously described embodiments, and accordingly similar elements are referred to with similar reference numerals, except that the reference numerals begin with "3."

Light field imaging system 310 consists of an array of optical elements 330, such as microlens array, and a 2D sensor array 320 which is located at its focal plane. Each microlens 332 in the microlens array represents one pixel or cell 334 in the light field imaging system 310. Each pixel 314 consists of one microlens 332 and at least one sensor of 2D sensor array 320. The 2D sensor array 320 may be any known 2D sensor array, including monochrome, RGB, hyperspectral, and/or polarization detection sensors.

Figure 14:
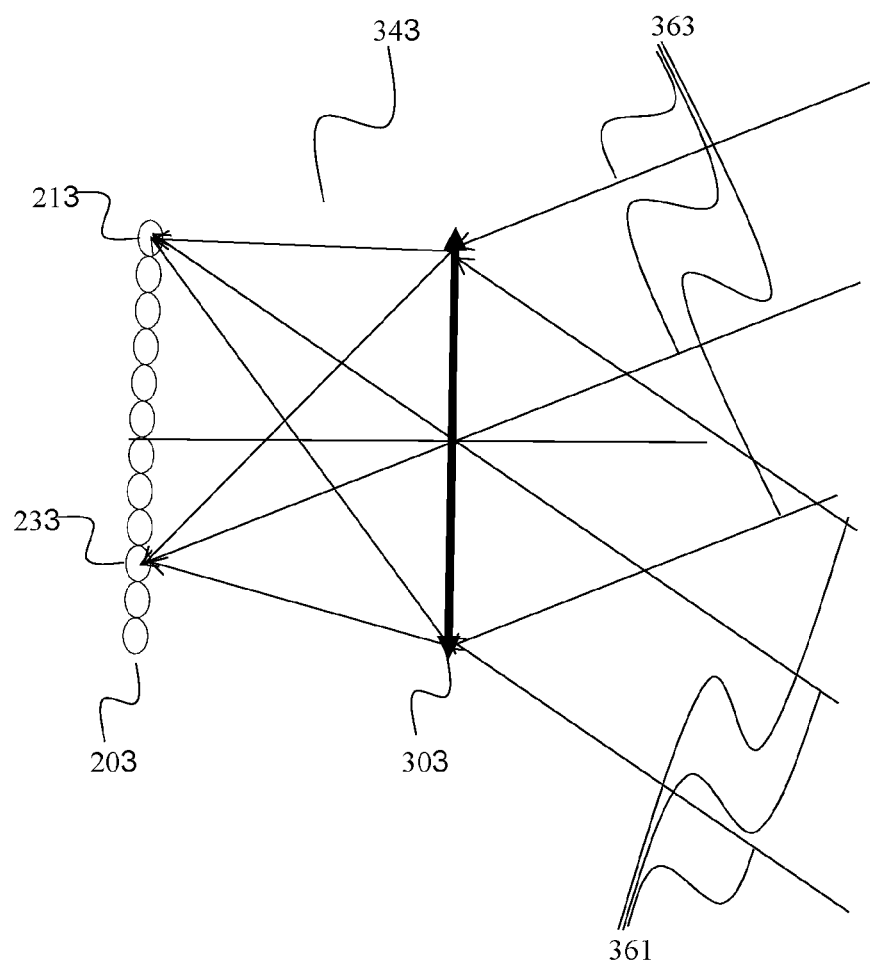
FIG. 14 is a schematic depiction of a setup of the light field imaging system with light beams being refracted by microlenses and being directed to sensors, according to embodiments of the invention.

Referring to FIG. 14, one pixel or cell 334 of the light field imaging system 310 is shown. Each pixel 334 consists of one microlens 332 from the microlens array and at least two sensors such as sensors 321, 323 of 2D sensor array 320, which is located at the microlens' focal plane. When the light rays emanating from any point in the scene impinge the microlens array 330, each microlens 332 focuses a pencil of light to its focal plane, wherein each pencil of light is directed to a different sensor according to the direction of its chief ray. For example, the light rays of light pencil 361 are directed and focused on sensor 321, and the light rays of light pencil 363 are directed and focused on sensor 323. Accordingly, not only the intensity of the light rays 361, 363 and their color is recorded, but also their direction. Optionally, polarizers may also be inserted to record the polarization.

The system of FIG. 14 has limited capacity for angular resolution, due to the limited number of sensors 322 in each pixel or cell 334 of the light field imaging system 310. The different angles of light pencils that can be recorded are accordingly limited, and angularly close points of the scene may be recorded on the same sensor in the pixel, causing the angular resolution to be reduced. Another limitation of this system is its limited field of view, which is also dependent on the number of sensors in each pixel in the light field imaging system. However, increasing the number of sensors in each pixel 322 will result in increasing the aperture dimensions of the microlenses 322, and thus decreasing the lateral resolution of the imaging system 310.

Figure 15A:
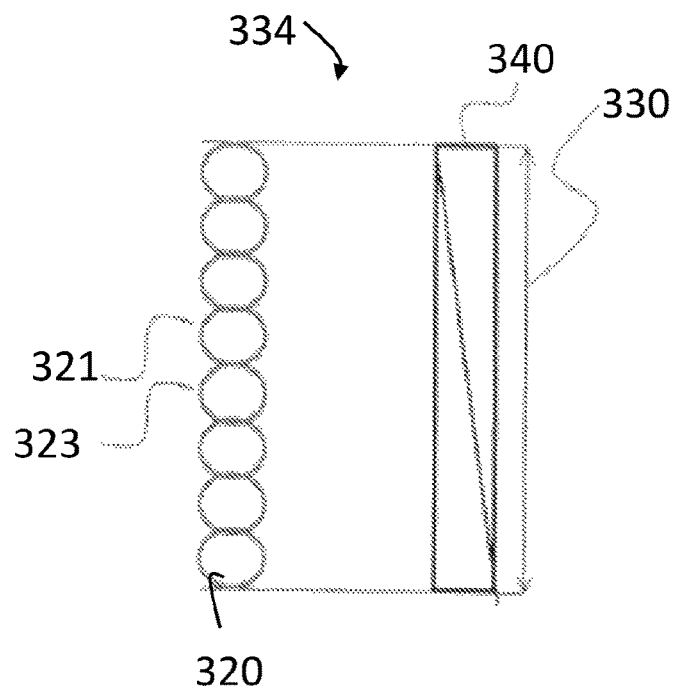
FIG. 15A is a schematic depiction of a light field imaging system with adjustable light deflecting devices, according to embodiments of the invention.

Referring to FIG. 15A, in order to increase the effective number of sensors 322 in each pixel or cell 334, without increasing the microlens dimension, an adjustable deflection device 340 is added. Adjustable deflection device 340 may include a liquid crystal system, a liquid crystal programmable grating, an electrooptics device, a micromirror, or any other device that can deflect and control the angle of propagation of the light rays. The adjustable deflection device 340 may be a similar device to devices 40, 140, 240 described with reference to the previous embodiments. Specifically, deflection device 340 may be controllable with a controller. In one exemplary embodiment, device 340 is a tunable microprism. Deflection device 340 may be placed laterally before or after the microlens array.

As shown in FIG. 15A, pixel or cell 334 in the light field imaging system 310 includes several sensors such as sensors 321, 323, one microlens 332, and an adjustable deflection device 340. By changing the angle of refraction or deflection of the device 340 as a function of time, a different angular image of the scene is recorded as a function of time. Stated differently, by changing the angles of the refraction or deflection of the device 340 as a function of time, different images of the sensors 322 of each pixel 334 is obtained, thus increasing the effective number of the pixels.

Figure 15B:
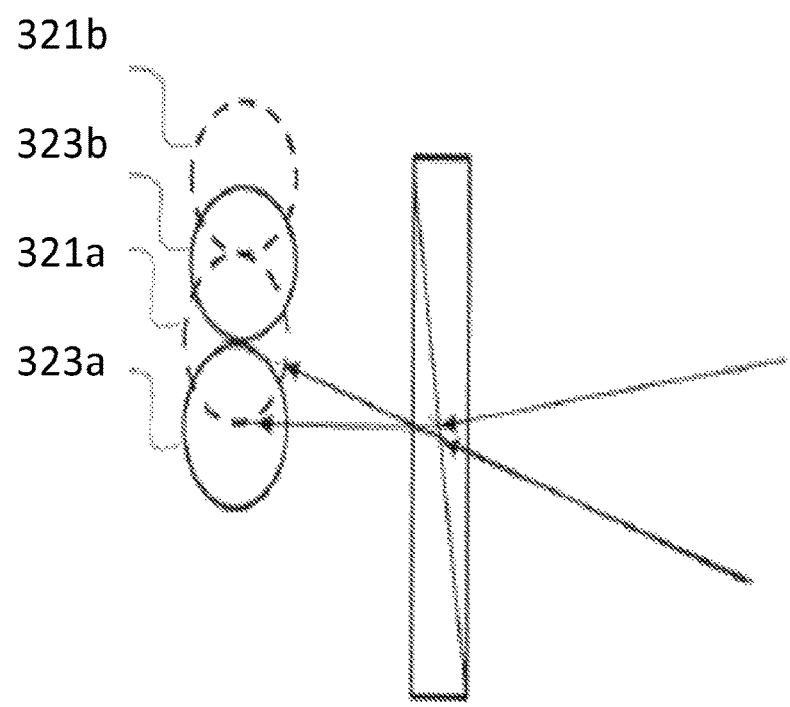
FIG. 15B is a schematic depiction of the adjustable light deflecting devices of FIG. 15A refracting two light beams toward image sensors, according to embodiments of the invention.

FIG. 15B shows the images observed by sensors 321 and 323 at two different times. At one deflection state of adjustable deflection device 340, the sensors appear to be located at pixel locations 321a and 323a, and at another deflection state of the adjustable deflection device 340, the sensors appear to be located at pixel locations 321b and 323b. Sensors 321b and 323b are seen as located in different angles compared to the sensors that are physically located in the plane of the sensor array 320. For instance, in sensors 321b and 323b are seen as located between sensors 321a and 323a, and thus another pencil of light with a different direction from the scene is also recorded. Another way to characterize the phenomenon is that the image that is displayed on the sensors 322 appears to be displaced in relation to its original location on the sensors. This arrangement thus increases the number of effective sensors 322.

The angles of propagation of the light beams of each pixel 334 may vary through operation of the adjustable deflection device 340 continuously or discretely. The device 340 may be changed many times, in many different angles, such that the image of each sensor 322 may be seen at a different angle at different times. Consequently, the effective density of the sensors 322 is increased by multiplexing the recorded scene in time and thus increasing the overall resolution of the light field imaging system.

It is apparent that the 3D display 10 and the light field imaging system are highly similar to each other. The difference between the two devices is that in the 3D display 10, the pixels 22 of the 2D display 20 emit light, and in the light field imaging system 310, the pixels of an array of detectors 320 receive light. Thus, all of the ideas and embodiments described above in the context of a 3D display screen for increasing the lateral and/or angular resolution and/or the field of view such as the ideas of using tunable deflection device and/or polarizers and/or filters, can also be implemented in light field imaging.

Various alternative arrangements for the other components of the 3D display device 10 or light field imaging device 310 may be implemented. For example, in the previously-disclosed embodiments, microlens arrays 30 comprise micro-spherical lenses. These lenses create a fan of beams that appear to come from a certain point from two dimensions, both right-left and up-down. Instead of using micro-spherical lenses, micro-cylindrical lenses array may be used to create fan of beams only in one dimension such as the "right-left." In this case, a deflection device for one dimension may be used. The polarizers and filters discussed in various embodiments above may also be either two-dimensional or one-dimensional.

Figure 16:
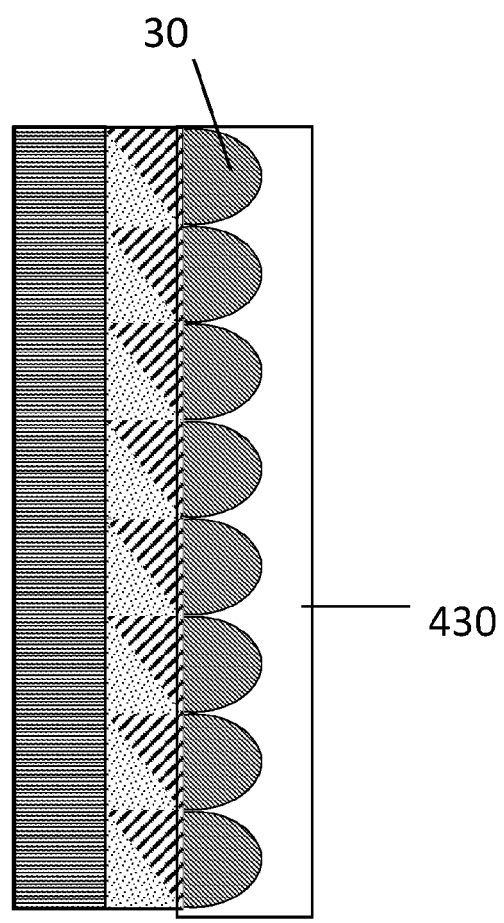
FIG. 16 is a schematic depiction of a microlens array in combination with a second microlens array which can be used to cancel the effect of the first microlens array, according to embodiments of the invention.

Also, with reference to FIG. 16, the micro lenses array 30 (whether spherical or cylindrical) in the 3D display may include "turn on" and "turn off" device, meaning that by "turning on" the device acts as micro lenses array and the optical imaging system acts as a 3D display or light field imaging system and by "turning off" the device it acts as a regular 2D display or imaging system. This can be accomplished by any known "turn on" and "turn off" micro lenses array device. For example, in FIG. 16, a positive micro lenses array 30 is covered by a negative micro lenses array device 430 to form a flat panel. When the refractive index of the two devices 30, 430 is different, each microlens 32 consists of a positive and negative microlens, and the overall optical power of is not zero. When the refractive index of the two devices is equal, the overall optical power of each microlens 32 is zero. The positive and/or the negative micro lenses arrays may be fabricated from any controllable material such as liquid crystal or electro-optic material.

Figure 17:
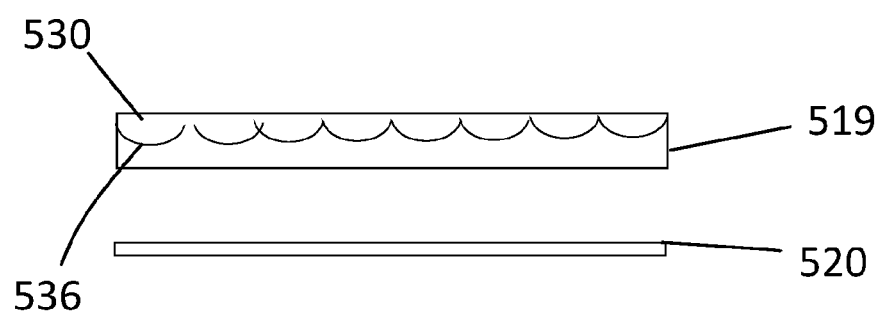
FIG. 17 is a schematic depiction of an alternative embodiment of a microlens array with spherical faces of the microlenses facing a two-dimensional display, according to embodiments of the invention.

In addition, in the embodiment of FIG. 17, the spherical portion of the microlens array 530 is directed towards the 2D display screen 520, rather than away from the 2D display screen 520. The spherical portion may also be enclosed in, or supported by, support 519, which may have a lower refractive index than microlens array 530, and which also forms a flat surface.

Figure 18:
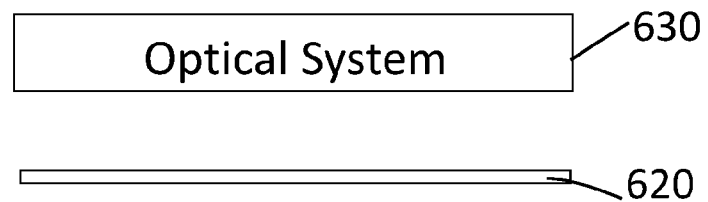
FIG. 18 is a schematic depiction of an alternative optical system used in place of a microlens array, according to embodiments of the invention.

In addition, in the embodiment of FIG. 18, in place of microlenses, another optical element 630 is used. Any optical element or array of optical elements may be so long as it performs the functions of focusing and collimating beams described above.

In addition, the adjustable deflection devices 40 that are used to deflect and control the angle of propagation of the light beams may be in any configuration such as one deflection device 40 to one cell or pixel, several tunable devices 40 to each cell or pixel, one deflection device to several cells or pixels, or even a deflection device for the whole 3D display or the light field imaging system.

The deflection device 40 may be for one dimensional deflection or for two dimensional deflection.

The deflection device 40 that is used to deflect and control the angle of propagation of the light beam in a cell or pixel may be a tunable prism, rotating mirror, movable deflecting lens, tunable grating or any other device that can deflect and control the angle of propagation of the light.

In addition, rather than using a light deflecting device to multiply the effective number of pixels, the same effect can be generated through microvibrations. The array of pixels, the array of optical elements, the polarizers, and/or the filters, or the entire device as a whole, can be vibrated a very small amount multiple times, so as to be located in multiple physical locations and/or angular orientations relative to the viewer during a period of integration of the human visual system. As a result, the viewer will perceive a cumulative 3D image which combines the 3D image displayed by the device at each location.

The concept of using a deflecting device to deflect and control the angle of propagation of the light beam emitted by a pixel in order to increase the effective pixels number can also be used in regular 2D displays such as to increase the effective number of the pixels and thus their lateral resolution.

The concept of using a deflecting device to deflect and control the angle of propagation of the light beam in each pixel in order to increase the effective sensors number can also be used in regular imaging systems, such as cameras, to increase their resolution.

The concept of using a deflecting device to deflect and control the angle of propagation of the light beam can also be used in any imaging system such as cameras to stabilize the field of view of the imaging system. When the field of view of the imaging system is not stabilized, the image "jumps" form pixel to pixel on the detectors array. Using a deflecting device to deflect and control the angle of propagation of the light rays of the scene, the light rays of the scene are deflected in an opposite direction to the "jump" of the image and thus the image is stabilized.

The angles of deflection of the light beams in each cell may vary according to each deflection device, continuously or discretely.

Each cell of a 3D display may include as few as one RGB pixel, or even only one R, G, or B subpixel. There can be also only one RGB sensor or even only one R, G or B sensor in each pixel of the light field imaging system.

The device 40 that is used to deflect and control the angle of propagation of the light beam may be located behind the microlens array 30, i.e. between the microlens array and the pixel array 20, or in front of the microlens array 30.

The concept of the disclosed embodiments can be extended to an illuminated 3D screen such as a movie screen where the image is projected on the screen by an image projector. Each "pixel" in the screen may consist of a rotating mirror such as the TI-DLP® such that at a certain time each mirror at each "pixel" of the screen which is synchronized with the image projector, deflects a certain light ray projected by the image projector with the appropriate color and intensity to a proper angle such that the observer sees a whole fan of rays coming from a certain point of the 3D object. By illuminating the screen with appropriate varying RGB images using an image projector, and controlling and varying the deflection angles of the mirrors, at any given moment the proper light ray with the proper color and intensity is deflected by a certain mirror such as it is seen at that moment as coming from the proper point of the object. As long as all light rays of the fan of the light rays of each point of the object are created within the integration time of the eye, even if not at the exact time, the object will be seen correctly.

The algorithm for creating the 3D image in the 3D display may include the following steps: (1) Creating a matrix of the 3D data, meaning, for each point to be displayed, designating a vector with the (x, y, z, R, G, B) data. 3D information for this matrix may be obtained from various devices, such as a CT or NMR scanner, or from a three dimensional camera such as Kinect®, or a light field camera. 3D information may also be obtained via two-dimensional photography, using two or more cameras, and relying on a suitable algorithm for the parallax effect. (2) creating the fan of rays for each point to be displayed by calculating the direction of all vectors from that point to each microlens center; (3) determining the proper R and/or G and/or B subpixel in each cell to create the ray of a point to be displayed by choosing the R and/or G and/or B subpixel that has the closest angle to the vector that passes through its cell; (4) turning on the proper R and/or G and/or B subpixels at the proper intensity such as to create the RGB light of the point to be displayed; (5) if a deflecting device is used, the same steps above are done taking into account the temporal image location of each R and/or G and/or B subpixels. 3D data for the algorithm may be obtained either by obtaining it directly by a 3D camera or by converting 2 parallax images to 3D data using known algorithms.

It is expected that during the life of a patent maturing from this application many types of screens and 2D displays will be developed and the scope of the terms screen and 2D display is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A device for time-based multiplexing of a projection of a three-dimensional image to increase a resolution thereof, comprising:
   a two-dimensional display comprising an array of a plurality of 2D pixels;
   an array of optical elements placed in front of the plurality of 2D pixels;
   an array of a plurality of adjustable light deflecting devices, each mounted in front of the pixels, wherein each of the plurality of adjustable light deflecting devices is structured to deflect the light emitted by the pixels; and
   at least one controller configured to direct the two-dimensional display to project a three-dimensional (3D) image comprised of a plurality of effective pixels derived from each pixel of the array of plurality of pixels, wherein each effective pixel is selected to correspond to a point in a 3D information set comprising a matrix with (x,y,z, R, G, B) vector data, said directing performed by instructing changing of a deflection angle of the light deflecting devices, and correspondingly instructing variation of at least one of the intensity or color of light emitted by each of the effective pixels, taking into account a temporal image location of each effective pixel due to the changing of the deflection angle, a plurality of times within a period of image integration of the human visual system;
   wherein a plurality of 3D cells are defined in the device, wherein each of the plurality of 3D cells comprises, along an optical axis perpendicular to the two-dimensional display:
   at least one from the plurality of 2D pixels, and
   a single optical element from the array of optical elements such that light from the respective at least one 2D pixel is directed as collimated light at an angle formed between the respective optical axis and a vector set between a center of the emitting pixel and a center of the single optical element;
   wherein the at least one controller is configured to direct the two-dimensional display after choosing for each of the plurality of 2D pixels one of an R, G, or B subpixels whose center has the closest angle relative to the respective optical axis to the angle of the vector calculated from a point (x,y,z) of the matrix with the (x,y,z, R, G, B) data to each microlens center; and
   wherein the 3D information is set according to an algorithm comprising the following steps:
   (1) creating the matrix of 3D data with (x, y, z, R, G, B) data for a plurality of points to be displayed;
   (2) creating a fan of rays for each point to be displayed by calculating a direction of all vectors from that point to a center of each microlens;
   (3) for each point to be displayed, determining a proper R, G, and/or B subpixel to create of a ray of a point to be displayed, by choosing an R, G, and/or B subpixel that has an angle closest to that of a vector that passes through its cell;
   (4) for each point to be displayed, turning on the proper R and/or G and/or B subpixels at the proper intensity such as to create the RGB light of the point to be displayed; and
   (5) performing steps (1)-(4) taking into account the temporal image location of each effective R and/or G and/or B subpixel.

2. The device of claim 1, wherein the array of optical elements is a microlens array, and the two-dimensional display is located at a focal plane of the microlens array.

3. The device of claim 2, wherein each microlens and corresponding subarray of neighboring pixels defines a cell, and further comprising barriers arranged between adjacent microlenses and configured to prevent cross-talk between adjacent cells.

4. The device of claim 2, wherein each corresponding subarray of neighboring pixels for each microlens comprises more than one pixel.

5. The device of claim 2, further comprising a removable micro-lens array that is arrangeable cooperatively with the micro-lens array to neutralize a refraction caused by the micro-lens array.

6. The device of claim 2, wherein each microlens comprises a flat face and a spherical face, and the spherical face is oriented facing the two-dimensional display.

7. The device of claim 1, wherein each adjustable light deflecting device deflects light emitted by each member of the subarray of neighboring pixels by less than a width of a pixel.

8. The device of claim 1, wherein the adjustable light deflecting devices comprise one or more of a tunable micro-prism, a liquid crystal system, a microelectromechanical system; an electro-optics device, a liquid crystal polarization grating device, or a micro-mirror.

9. The device of claim 8, wherein the adjustable light deflecting devices comprise an array of micro-prisms and corresponding liquid crystal system, and wherein a deflection angle of each micro-prism is adjustable by activation of a corresponding liquid crystal system.

10. The device of claim 1, wherein the pixels are RGB pixels, a fill factor of each of the respective red, green, and blue pixels is approximately 25%, and as a result of said time-based multiplexing, light from each of the respective red, green and blue pixels is perceived as being emitted from an entirety of the array of pixels.

11. The device of claim 1, further comprising a first array of polarizers and a second array of polarizers coplanar to the array of pixels and a focusing element; wherein, when the light beams emitted by pixels pass through the first and second arrays of polarizers, a first portion of said light beams is polarized in a first direction, and a second portion of said light beams is polarized in a second direction perpendicular to the first direction.

12. The device of claim 11, wherein the array of optical elements is a microlens array, each microlens and subarray of neighboring pixels parallel thereto defines a 3D pixel, and at least a portion of light rays emitted by pixels of a given 3D pixel, after passing through the first and second arrays of polarizers, is diverted to pass through a microlens associated with a different 3D pixel.

13. The device of claim 12, wherein the pixels are RGB pixels, a fill factor of each of the respective red, green, and blue pixels when passing through the arrays of polarizers is approximately 12.5%, and, as a result of said time-based multiplexing, light from each of the respective red, green, and blue pixels is perceived as being emitted from an entirety of the array of pixels.

14. (withdrawn, currently amended) The device of claim 1, wherein the pixels are RGB pixels, and further comprising one or more color filters, wherein each of the color filters is configured to permit passage of only one of red, green or blue light.

15. The device of claim 14, wherein the array of optical elements is a microlens array, each microlens and subarray of neighboring pixels parallel thereto defines a cell, and the color filters of adjacent cells are patterned cyclically to alternately permit passage of red, green, or blue light.

16. The device of claim 1, wherein the adjustable light deflecting devices are located between the array of pixels and the array of optical elements.

17. The device of claim 1, wherein the array of optical elements is located between the array of pixels and the array of a plurality of adjustable light deflecting devices.

18. A method for time-based multiplexing of a projection of a three-dimensional image to increase resolution thereof, wherein the image is generated by a two-dimensional display comprising an array of a plurality of 2D pixels, an array of optical elements placed in front of the plurality of 2D pixels, and an array of a plurality of adjustable light deflecting devices is mounted in front of the pixels, wherein each of the plurality of adjustable light deflecting devices is structured to deflect the light emitted by the pixels, and at least one controller, the method comprising:
  with the controller, directing the two-dimensional display to project a three-dimensional image comprised of a plurality of effective pixels derived from each pixel of the array of plurality of pixels, wherein each effective pixel is selected to correspond to a point in a 3D information set comprising a matrix with (x,y,z, R, G, B) vector data, the directing step comprising:
    instructing changing of a deflection angle of the light deflecting devices, and correspondingly instructing variation of at least one of an intensity or color of light emitted by each of the effective pixels, taking into account a temporal image location of each effective pixel due to the changing of the deflection angle, a plurality of times within a period of image integration of the human visual system;
  wherein a plurality of 3D cells are defined in the device, wherein each of the plurality of 3D cells comprises, along an optical axis perpendicular to the two-dimensional display:
  at least one from the plurality of 2D pixels, and
  a single optical element from the array of optical elements such that light from the respective at least one 2D pixel is directed as collimated light at an angle formed between the respective optical axis and a vector set between a center of the emitting pixel and a center of the single optical element;
  wherein the at least one controller is configured to direct the two-dimensional display after choosing for each of the plurality of 2D pixels one of an R, G, or B subpixels whose center has the closest angle relative to the respective optical axis to the angle of the vector calculated from a point (x,y,z) of the matrix with the (x,y,z, R, G, B) data to each microlens center; and
  wherein the directing step comprises following an algorithm having the following steps:
    (1) creating the matrix of 3D data with (x, y, z, R, G, B) data for a plurality of points to be displayed;
    (2) creating a fan of rays for each point to be displayed by calculating a direction of all vectors from that point to a center of each microlens;
    (3) for each point to be displayed, determining a proper R, G, and/or B subpixel to create of a ray of a point to be displayed, by choosing an R, G, and/or B subpixel that has an angle closest to that of a vector that passes through its cell;
    (4) for each point to be displayed, turning on the proper R and/or G and/or B subpixels at the proper intensity such as to create the RGB light of the point to be displayed; and
    (5) performing steps (1)-(4) taking into account the temporal image location of each effective R and/or G and/or B subpixel.

19. The method as defined in claim 18, wherein the adjustable light deflecting devices comprise one or more of a micro-prism, a liquid crystal system, a microelectromechanical system; an electro-optics device, a liquid crystal polarization grating device, or a micro-mirror.

20. The method as defined in claim 18, wherein the array of optical elements is a microlens array, the adjustable light deflecting devices comprise an array of micro-prisms and corresponding liquid crystal systems, and wherein the adjusting step comprises activating a liquid crystal system to thereby adjust an angle of deflection of a corresponding micro-prism.

21. The method as defined in claim 18, wherein the array of optical elements is a microlens array, and further comprising releasably attaching a removable micro-lens array to the micro-lens array to neutralize a refraction caused by the micro-lens array.

* * * * *